United States Patent
Schmier et al.

(10) Patent No.: US 9,092,370 B2
(45) Date of Patent: Jul. 28, 2015

(54) POWER FAILURE TOLERANT CRYPTOGRAPHIC ERASE

(71) Applicant: SanDisk Enterprise IP LLC, Milpitas, CA (US)

(72) Inventors: Jacob Schmier, Gilbert, AZ (US); Mark Dancho, Chandler, AZ (US); Ryan Jones, Mesa, AZ (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 0 days.

(21) Appl. No.: 14/135,256

(22) Filed: Dec. 19, 2013

(65) Prior Publication Data

US 2015/0154121 A1 Jun. 4, 2015

Related U.S. Application Data

(60) Provisional application No. 61/911,403, filed on Dec. 3, 2013.

(51) Int. Cl.
*G06F 21/00* (2013.01)
*G06F 12/14* (2006.01)
(Continued)

(52) U.S. Cl.
CPC .......... *G06F 12/1408* (2013.01); *G06F 3/0623* (2013.01); *G06F 3/0653* (2013.01); *G06F 3/0673* (2013.01); *G06F 21/60* (2013.01)

(58) Field of Classification Search
CPC ........................................................ G06F 21/78
USPC ........................................................ 713/193
See application file for complete search history.

(56) References Cited

U.S. PATENT DOCUMENTS

| 4,916,652 A | 4/1990 | Schwarz et al. |
| 5,519,847 A | 5/1996 | Fandrich et al. |
| 5,530,705 A | 6/1996 | Malone, Sr. |

(Continued)

FOREIGN PATENT DOCUMENTS

| EP | 1465203 A1 | 10/2004 |
| JP | 2002-532806 S | 10/2002 |

(Continued)

OTHER PUBLICATIONS

Barr, Introduction to Watchdog Timers, Oct. 2001, 3 pgs.

(Continued)

*Primary Examiner* — Morshed Mehedi
(74) *Attorney, Agent, or Firm* — Morgan, Lewis & Bockius LLP

(57) ABSTRACT

The various implementations described herein include systems, methods and/or devices used to enable power failure tolerant cryptographic erasure in a storage device having a first encryption key established as a current encryption key. The method includes performing a set of first stage operations including selecting first and second sets of memory blocks and obtaining a second encryption key. The method includes performing a set of second stage operations including storing, in the first set of memory blocks, first and second sets of metadata, encrypted using the second encryption key. The method includes performing a set of third stage operations, including storing, in the second set of memory blocks, the second set of metadata encrypted using the second encryption key. The method includes setting the second encryption key as the current encryption key for the plurality of memory blocks.

30 Claims, 9 Drawing Sheets

(51) Int. Cl.
*G06F 3/06* (2006.01)
*G06F 21/60* (2013.01)

(56) References Cited

U.S. PATENT DOCUMENTS

| | | |
|---|---|---|
| 5,537,555 A | 7/1996 | Landry et al. |
| 5,551,003 A | 8/1996 | Mattson et al. |
| 5,657,332 A | 8/1997 | Auclair et al. |
| 5,666,114 A | 9/1997 | Brodie et al. |
| 5,943,692 A | 8/1999 | Marberg et al. |
| 5,982,664 A | 11/1999 | Watanabe |
| 6,000,006 A | 12/1999 | Bruce et al. |
| 6,016,560 A | 1/2000 | Wada et al. |
| 6,295,592 B1 | 9/2001 | Jeddeloh |
| 6,311,263 B1 | 10/2001 | Barlow et al. |
| 6,393,584 B1* | 5/2002 | McLaren et al. ............... 714/14 |
| 6,442,076 B1 | 8/2002 | Roohparvar |
| 6,449,625 B1 | 9/2002 | Wang |
| 6,484,224 B1 | 11/2002 | Robins et al. |
| 6,678,788 B1* | 1/2004 | O'Connell .................. 711/114 |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,871,257 B2 | 3/2005 | Conley et al. |
| 6,895,464 B2 | 5/2005 | Chow et al. |
| 6,978,343 B1 | 12/2005 | Ichiriu |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,032,123 B2 | 4/2006 | Kane et al. |
| 7,043,505 B1 | 5/2006 | Teague et al. |
| 7,100,002 B2 | 8/2006 | Shrader |
| 7,111,293 B1 | 9/2006 | Hersh et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,516,292 B2 | 4/2009 | Kimura et al. |
| 7,523,157 B2 | 4/2009 | Aguilar, Jr. et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,971,112 B2 | 6/2011 | Murata |
| 7,978,516 B2 | 7/2011 | Olbrich et al. |
| 7,996,642 B1 | 8/2011 | Smith |
| 8,032,724 B1 | 10/2011 | Smith |
| 8,412,985 B1 | 4/2013 | Bowers et al. |
| 2002/0024846 A1 | 2/2002 | Kawahara et al. |
| 2002/0083299 A1 | 6/2002 | Van Huben et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0074592 A1* | 4/2003 | Hasegawa .................. 713/324 |
| 2003/0088805 A1 | 5/2003 | Majni et al. |
| 2003/0093628 A1 | 5/2003 | Matter et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2004/0252670 A1* | 12/2004 | Rong et al. .................... 370/343 |
| 2005/0060456 A1 | 3/2005 | Shrader et al. |
| 2005/0060501 A1 | 3/2005 | Shrader |
| 2005/0114587 A1* | 5/2005 | Chou et al. .................... 711/103 |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0039196 A1* | 2/2006 | Gorobets et al. ......... 365/185.01 |
| 2006/0053246 A1 | 3/2006 | Lee |
| 2006/0085671 A1 | 4/2006 | Majni et al. |
| 2006/0136570 A1 | 6/2006 | Pandya |
| 2006/0156177 A1 | 7/2006 | Kottapalli et al. |
| 2006/0195650 A1 | 8/2006 | Su et al. |
| 2006/0259528 A1 | 11/2006 | Dussud et al. |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0083779 A1* | 4/2007 | Misaka et al. ................ 713/300 |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1* | 8/2007 | Fujibayashi et al. ......... 711/112 |
| 2007/0208901 A1 | 9/2007 | Purcell et al. |
| 2007/0234143 A1 | 10/2007 | Kim |
| 2007/0245061 A1 | 10/2007 | Harriman |
| 2007/0277036 A1 | 11/2007 | Chamberlain et al. |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0052446 A1 | 2/2008 | Lasser et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2009/0003058 A1 | 1/2009 | Kang |
| 2009/0037652 A1 | 2/2009 | Yu et al. |
| 2009/0144598 A1 | 6/2009 | Yoon et al. |
| 2009/0168525 A1* | 7/2009 | Olbrich et al. ............ 365/185.11 |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0222708 A1 | 9/2009 | Yamaga |

(56) References Cited

U.S. PATENT DOCUMENTS

| | | | |
|---|---|---|---|
| 2009/0296466 A1 | 12/2009 | Kim et al. | |
| 2009/0296486 A1 | 12/2009 | Kim et al. | |
| 2009/0319864 A1 | 12/2009 | Shrader | |
| 2010/0008175 A1* | 1/2010 | Sweere et al. | 365/229 |
| 2010/0061151 A1 | 3/2010 | Miwa et al. | |
| 2010/0103737 A1* | 4/2010 | Park | 365/185.09 |
| 2010/0199125 A1 | 8/2010 | Reche | |
| 2010/0202196 A1 | 8/2010 | Lee et al. | |
| 2010/0208521 A1 | 8/2010 | Kim et al. | |
| 2010/0262889 A1 | 10/2010 | Bains | |
| 2010/0281207 A1 | 11/2010 | Miller et al. | |
| 2010/0281342 A1 | 11/2010 | Chang et al. | |
| 2011/0066872 A1* | 3/2011 | Miller et al. | 713/340 |
| 2011/0083060 A1 | 4/2011 | Sakurada et al. | |
| 2011/0085657 A1* | 4/2011 | Matthews, Jr. | 380/28 |
| 2011/0113281 A1 | 5/2011 | Zhang et al. | |
| 2011/0131444 A1 | 6/2011 | Buch et al. | |
| 2011/0205823 A1 | 8/2011 | Hemink et al. | |
| 2011/0213920 A1 | 9/2011 | Frost et al. | |
| 2011/0228601 A1 | 9/2011 | Olbrich et al. | |
| 2011/0231600 A1 | 9/2011 | Tanaka et al. | |
| 2012/0054456 A1* | 3/2012 | Grube et al. | 711/158 |
| 2012/0096217 A1 | 4/2012 | Son et al. | |
| 2012/0195126 A1 | 8/2012 | Roohparvar | |
| 2012/0239976 A1 | 9/2012 | Cometti et al. | |
| 2012/0271990 A1* | 10/2012 | Chen et al. | 711/103 |
| 2013/0019076 A1* | 1/2013 | Amidi et al. | 711/162 |
| 2014/0006798 A1* | 1/2014 | Prakash et al. | 713/189 |

FOREIGN PATENT DOCUMENTS

| | | |
|---|---|---|
| WO | WO 2007/036834 A2 | 4/2007 |
| WO | WO 2007/080586 A2 | 7/2007 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/134576 A1 | 11/2009 |

OTHER PUBLICATIONS

Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology—AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
IBM Corporation, "Systems Management, Work Management," Version 5, Release 4, 9th Edition, Feb. 2006, pp. 1-21.
Texas instruments, "Power Management IC For Digitai Set Top Boxes," SLVSA10A, Sep. 2009, pp. 1-22.
International Search Report and Written Opinion dated Jan. 26, 2015, received in International Patent Application No. PCT/US2014/059118, which corresponds to U.S. Appl. No. 14/135,371, 11 pages (Lucas).
International Search Report and Written Opinion dated Jul. 26, 2013, received in International Patent Application. No. PCT/US2013/035182, which corresponds to U.S. Appl. No. 13/855,587, 7 pages (Ellis).
International Preliminary Report on Patentability dated Oct. 30, 2014, received in International Patent Application No. PCT/US2013/035102, which corresponds to U.S. Appl. No. 13/855,567, 4 pages (Ellis).

* cited by examiner

Figure 4

| Stage | Cryptographic Key | Volatile Memory | First Set of Memory Blocks (Metadata/Non-metadata) | | Second Set of Memory Blocks (Metadata/Non-metadata) | | Power Fail Non-Volatile Memory | Power Fail | |
|---|---|---|---|---|---|---|---|---|---|
| 1 | Key 1 | Decrypted First and Second Set Metadata | First set, using Key 1 | Data | Second set, using Key 1 | Data | | No | 402 |
| 1 | Key 1/ Key 2 | Decrypted First and Second Set Metadata | First set, using Key 1 | Data | Second set, using Key 1 | Data | | No | 403 |
| 2 | Key 1/ Key 2 | Decrypted First and Second Set Metadata | First set, using Key 1 | Data | Second set, using Key 1 | Data | | No | 404 |
| 2 | Key 1/ Key 2 | Decrypted First and Second Set Metadata | Erased | Erased | Second set, using Key 1 | Data | | No | 405 |
| 2 | Key 2/ Key 1 | Decrypted First and Second Set Metadata | First set, using Key 2 | Erased | Second set, using Key 1 | Data | | No | 406 |
| 2 | Key 2/ Key 1 | Decrypted First and Second Set Metadata | First set, using Key 2 | Second set, using Key 2 | Second set, using Key 1 | Data | | No | 407 |
| 2 | Key 1/ Key 2 | | power failure affected | Erased | Second set, using Key 1 | Data | First set, using Key 1 | Yes | 410 |
| 3 | Key 2/ Key 1 | Decrypted First and Second Set Metadata | First set, using Key 2 | Second set, using Key 2 | Second set, using Key 1 | Data | | No | 412 |
| 3 | Key 2/ Key 1 | Decrypted First and Second Set Metadata | First set, using Key 2 | Second set, using Key 2 | Erased | Erased / Data | | No | 414 |
| 3 | Key 2/ Key 1 | Decrypted First and Second Set Metadata | First set, using Key 2 | Second set, using Key 2 | Second set, using Key 2 | Erased / Data | | No | 416 |
| 3 | Key 1/ Key 2 | | First set, using Key 2 | Second set, using Key 2 | power failure affected | Erased / Data | First set, using Key 1 | Yes | 417 |
| 4 | Key 2/ Key 1 | Decrypted First and Second Set Metadata | Erased | Erased | Second set, using Key 2 | Erased / Data | | No | 418 |
| 4 | Key 2 | Decrypted First and Second Set Metadata | First set, using Key 2 | Erased | Second set, using Key 2 | Erased / Crypto Erased | | No | 420 |
| 4 | Key 2/ Key 1 | | Erased | Erased | Second set, using Key 2 | Erased / Data | First set, using Key 2 | Yes | 422 |

US 9,092,370 B2

POWER FAILURE TOLERANT CRYPTOGRAPHIC ERASE

RELATED APPLICATION

This application claims priority to U.S. Provisional Patent Application Ser. No. 61/911,403, filed Dec. 3, 2013, entitled "Power Failure Tolerant Cryptographic Erase," which is herein incorporated by reference in its entirety.

TECHNICAL FIELD

The disclosed embodiments relate generally to memory systems, and in particular, to power-failure tolerant cryptographic erasure of data in storage devices (e.g., memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable power-failure tolerant cryptographic erasure in storage devices.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 4 is a table illustrating several states of data in various volatile and non-volatile memory storage locations in an exemplary flash memory device, while performing a cryptographic erase operation.

Figure 1A:
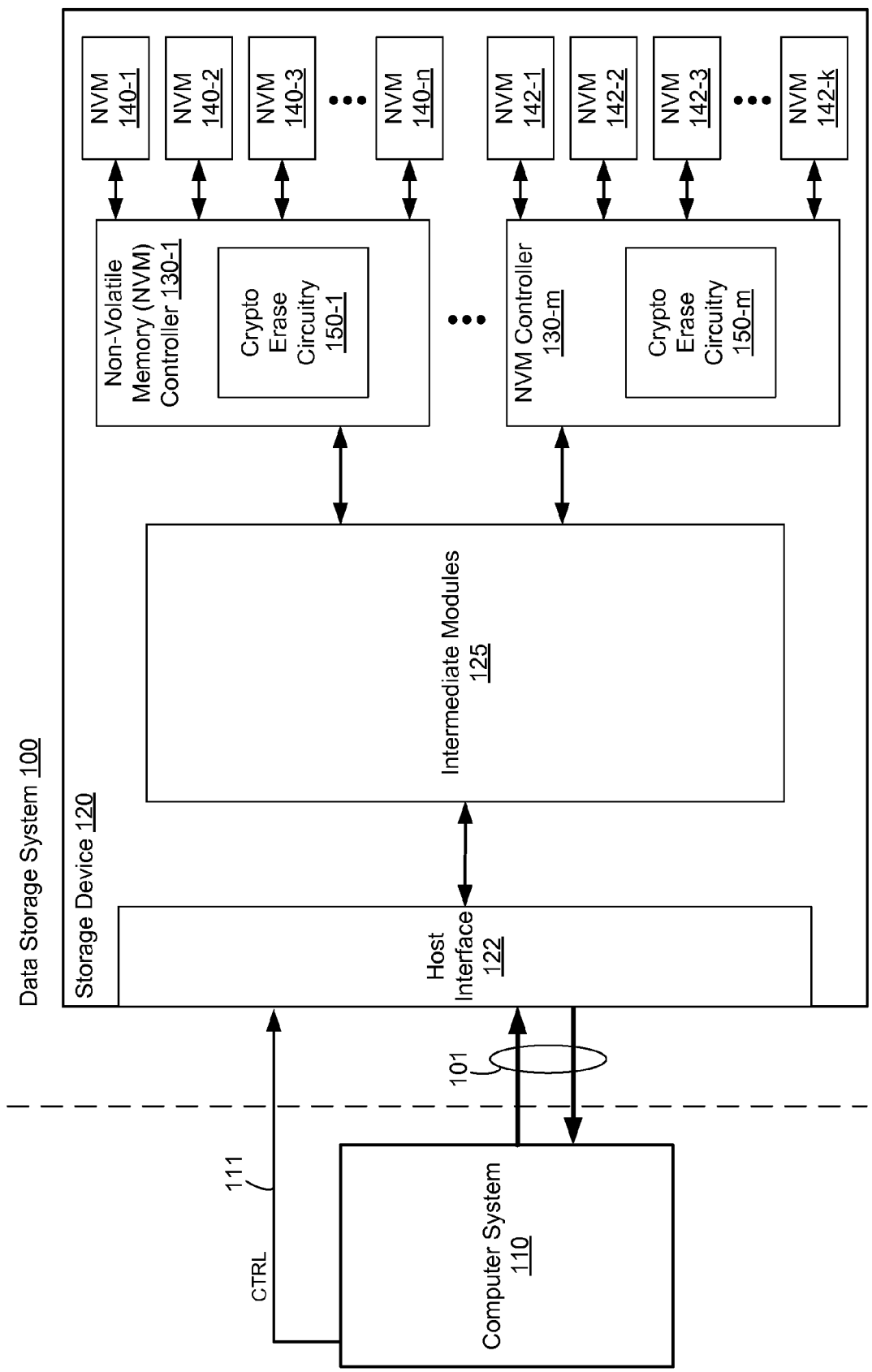
FIG. 1A is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable power-failure tolerant cryptographic erasure in storage devices. Some implementations include systems, methods and/or devices to perform a cryptographic erase operation on one portion of the encrypted data stored in a storage device while preserving other encrypted data (e.g., metadata) that is stored in the same storage device and that is encrypted using the same encryption key as the data that is to be cryptographically erased.

Some storage devices store encrypted data and include secure encryption circuitry or modules to securely encrypt and decrypt data stored on those devices. As described in more detail below, in some storage devices that are used to store encrypted data, the only copy or copies of the encryption/decryption key for encrypting and decrypting data are securely stored within the device itself. For ease of discussion herein, encryption/decryption keys are herein called encryption keys, even for implementations in which the encryption and corresponding decryption keys are not identical. In one example, an encrypted version of the encryption key is stored "in plain sight" in non-volatile memory (e.g., NOR flash memory), and that key is converted into the actual encryption key using secure encryption circuitry in the storage device. The secure encryption circuitry uses a key encryption key (i.e., an encryption key whose primary function is to encrypt or decrypt other encryption keys) that is either embedded in the encryption circuitry or otherwise securely stored in or obtained by the secure encryption circuitry to encrypt and decrypt one or more encryption keys. Each encryption key that is used to encrypt and decrypt data, excluding any encrypted version of the key, exists solely within the secure encryption circuitry. Any number of schemes for securely managing such encryption keys are known, the details of which are not relevant here.

The term "cryptographically erase" is used herein to mean "erasing" data by destroying (e.g., deleting) the only copy or copies of the encryption key used to encrypt the data that is to be cryptographically erased. While cryptographically erasing encrypted data does not necessarily physically erase the encrypted data, it renders the encrypted data unreadable, and effectively turns that data into noise. As used herein, the term "erase" refers to physically (and electrically) erasing data, as distinguished from cryptographically erasing data, which (as noted above) does not require physically erasing data.

The present document addresses the problem of "cryptographically erasing" some encrypted data stored in a storage device while retaining other encrypted data that is stored in the same storage device and encrypted using the same encryption key. Furthermore, the problem addressed concerns how to re-encrypt the data to be retained in a manner that is not vulnerable to power failures during the data erasing and re-encryption process.

More specifically, some implementations include a method of cryptographically erasing data in a storage device. In some implementations, the method includes updating a durably stored progress indicator to indicate a first stage. The method also includes, performing a set of first stage operations, including selecting or identifying a first set of memory blocks and a second set of memory blocks from a plurality of memory blocks on the storage device. The second set of memory blocks does not comprise any memory block in the first set of memory blocks and obtaining a second encryption key. The method includes, in accordance with a determination that a power failure condition did not occur while the progress indicator indicates the first stage, updating the progress indicator to indicate a second stage. The method further includes performing a set of second stage operations, including storing, in the first set of memory blocks, a first set of metadata corresponding to the first set of memory blocks, encrypted using the second encryption key, and storing, in the first set of memory blocks, a second set of metadata corresponding to the second set of memory blocks, encrypted using the second encryption key. The method further includes, in accordance with a determination that a power fail condition did not occur while the progress-counter indicates the second stage, the method includes updating the progress indicator to indicate a third stage, performing a set of third stage operations, including storing the second set of metadata in the second set of memory blocks. The method includes, subsequent to storing, in the second set of memory blocks, the second set of metadata encrypted using the second encryption key, setting the second encryption key as the current encryption key for the plurality of memory blocks.

In some embodiments, the method further includes, in accordance with a determination that a power fail condition occurred while the progress indicator indicates the first stage, repeating performance of the first stage operations.

In some embodiments, the method further includes, in accordance with a determination that a power fail condition occurred while the progress indicator indicates the second stage, repeating performance of the second stage operations.

In some embodiments, the method further includes, in accordance with a determination that a power fail condition occurred while the progress indicator indicates the third stage, repeating performance of the third stage operations.

In some embodiments, the method includes, prior to storing, in the first set of memory blocks, the second set of metadata encrypted using the second encryption key, (1) decrypting the second set of metadata using the first encryption key and (2) encrypting the second set of metadata using the second encryption key.

In some embodiments, the second stage operations include durably storing information identifying the first set of memory blocks.

In some embodiments, setting the second encryption key as the current encryption key for the plurality of memory blocks includes rendering the first encryption key unusable.

In some embodiments, obtaining a second encryption key includes (1) encrypting the second encryption key and (2) durably storing the encrypted second encryption key.

In some embodiments, selecting or identifying the first set of memory blocks from a plurality of memory blocks on the storage device includes selecting memory blocks with the fewest erase cycles, the fastest read or write times or the first available memory block.

In some embodiments, the method includes, subsequent to storing, in the second set of memory blocks, the second set of metadata encrypted using the second encryption key, erasing at least a portion of the first set of memory blocks and storing, in the erased portion of the first set of memory blocks, the first set of metadata encrypted using the second encryption key.

In some embodiments, the storage device includes a plurality of controllers.

In some embodiments, the plurality of controllers on the storage device include a memory controller and one or more flash controllers, the one or more flash controllers coupled by the memory controller to a host interface of the storage device.

In some embodiments, the plurality of controllers on the storage device include at least one non-volatile memory (NVM) controller and at least one other memory controller other than the at least one NVM controller.

In some embodiments, the storage device includes a dual in-line memory module (DIMM) device.

In some embodiments, one of the plurality of controllers on the storage device maps double data rate (DDR) interface commands to serial advance technology attachment (SATA) interface commands.

In some embodiments, a method of cryptographically erasing data in a storage device includes performing a power-failure tolerant cryptographic erase operation. The storage device has a first set of memory blocks and a second set of memory blocks, and the first set of memory blocks stores a first set of metadata and the second set of memory blocks stores a second set of metadata. The storage device further has a first encryption key established as a current encryption key, to encrypt metadata and data, if any, in at least the first and second sets of memory blocks, prior to performance of the method. Performing the power-failure tolerant cryptographic erase operation includes (1) obtaining and storing a second encryption key, (2) storing, in the first set of memory blocks, the second set of metadata encrypted with the second encryption key, (3) subsequent to storing, in the first set of memory blocks, the second set of metadata encrypted with the second encryption key, storing the second set of metadata encrypted with the second encryption key at corresponding locations in the second set of memory blocks, (4) storing the first set of metadata encrypted with the second encryption key in the first set of memory blocks, and (5) establishing the second encryption key as the current encryption key to encrypt metadata and data, if any, in at least the first and second sets of memory blocks. Performing the cryptographic erase operation further includes (6) storing in NVM a progress indicator that indicates a stage of the cryptographic erase operation, and updating the progress indicator upon completion of each stage of a predefined set of stages of the cryptographic erase operation, (7) determining whether a power failure has occurred while performing the cryptographic erase operation, and (8) in accordance with a determination that a power failure has occurred while performing the cryptographic erase operation, resuming performance of the cryptographic erase operation at a stage corresponding to a value of the progress indicator.

In another aspect, any of the methods described above are performed by a storage device including (1) an interface for coupling the storage device to a host system, (2) a controller having one or more processors, the controller configured to: (A) update a durably stored progress indicator to indicate a first stage, (B) perform a set of first stage operations, including: (a) selecting or identifying a first set of memory blocks and a second set of memory blocks from a plurality of memory blocks on the storage device. The second set of memory blocks does not comprise any memory block in the first set of memory blocks, and (b) obtaining a second encryption key, (C) in accordance with a determination that a power fail condition did not occur while the progress indicator indicates the first stage: (a) update the progress indicator to indicate a second stage, and (b) perform a set of second stage operations, including: (i) storing, in the first set of memory blocks, a first set of metadata corresponding to the first set of memory blocks, encrypted using the second encryption key, and (ii) storing, in the first set of memory blocks, a second set of metadata corresponding to the second set of memory blocks, encrypted using the second encryption key, (D) in accordance with a determination that a power fail condition did not occur while the progress-counter indicates the second stage: (a) update the progress indicator to indicate a third stage, (b) perform a set of third stage operations, including storing the second set of metadata in the second set of memory blocks, and (c) subsequent to storing the second set of metadata in the second set of memory blocks, set the second encryption key as the current encryption key for the plurality of memory blocks.

In some embodiments, the storage device is configured to perform any of the methods described above.

In yet another aspect, any of the methods described above are performed by a storage device operable to cryptographically erase data. In some embodiments, the device includes (A) an interface for coupling the storage device to a host system, (B) means for updating a durably stored progress indicator to indicate a first stage, and (C) means for performing a set of first stage operations, including: (a) means for selecting or identifying a first set of memory blocks and a second set of memory blocks from a plurality of memory blocks on the storage device. The second set of memory blocks does not comprise any memory block in the first set of memory blocks, and (b) means for obtaining a second encryption key, and (D) storing means for performing a set of operations in accordance with a determination that a power fail condition did not occur while the progress indicator indicates the first stage, including: (a) means for updating the progress indicator to indicate a second stage, and (b) means for performing a set of second stage operations, including: (i) means for storing, in the first set of memory blocks, a first set of metadata corresponding to the first set of memory blocks, encrypted using the second encryption key, and (ii) means for storing, in the first set of memory blocks, a second set of metadata corresponding to the second set of memory blocks, encrypted using the second encryption key, (E) storing means for performing a set of operations in accordance with a determination that a power fail condition did not occur while the progress-counter indicates the second stage, including: (a) means for updating the progress indicator to indicate a third stage, and (b) means for performing a set of third stage operations, including means for storing the second set of metadata in the second set of memory blocks, and (c) means, enabled subsequent to storing the second set of metadata in the second set of memory blocks, for setting the second encryption key as the current encryption key for the plurality of memory blocks.

In yet another aspect, a non-transitory computer readable storage medium stores one or more programs for execution by one or more processors of a storage device, the one or more programs including instructions for performing any one of the methods described above.

In some embodiments, the storage device includes a plurality of controllers, and the non-transitory computer readable storage medium includes a non-transitory computer readable storage medium for each controller of the plurality of controllers, each having one or more programs including instructions for performing any one of the methods described above.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1A is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120, which includes host interface 122, intermediate modules 125, one or more NVM controllers (e.g., NVM controller(s) 130), and NVM (e.g., one or more NVM device(s) 140, 142), and is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to storage device 120 through data connections 101. However, in some implementations computer system 110 includes storage device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

In some implementations, storage device 120 includes NVM devices 140, 142 (e.g., NVM devices 140-1 through 140-$n$ and NVM devices 142-1 through 142-$k$) and NVM controllers 130 (e.g., NVM controllers 130-1 through 130-$m$). In some implementations, each NVM controller of NVM controllers 130 include one or more processing units (also sometimes called CPUs or processors or microprocessors or microcontrollers) configured to execute instructions in one or more programs (e.g., in NVM controllers 130). In some implementations, each NVM controller of NVM controllers 130 includes crypto erase circuitry 150 (also called a cryptographic erase circuitry). NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers. Although flash memory devices and flash controllers are used as an example here, storage device 120 may include any other NVM device(s) and corresponding NVM controller(s).

In some implementations, intermediate modules 125 include one or more processing units (also sometimes called CPUs or processors or microprocessors or microcontrollers) configured to execute instructions in one or more programs. Intermediate modules 125 are coupled to host interface 122 and NVM controllers 130, in order to coordinate the operation of these components, including supervising and controlling functions such as power up, power down, data hardening, charging energy storage device(s), data logging, communicating between modules on storage device 120 and other aspects of managing functions on storage device 120.

Figure 1B:
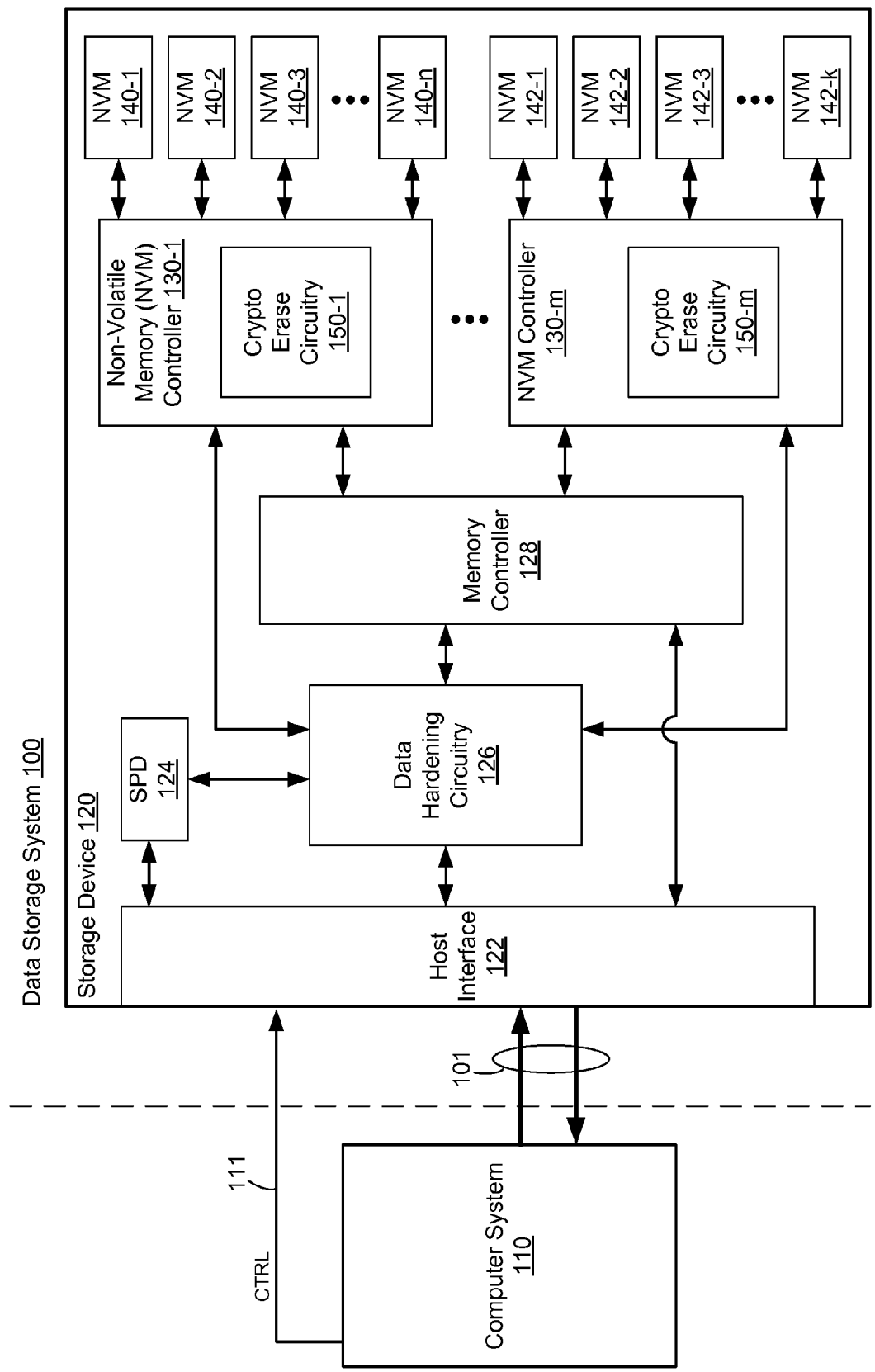
FIG. 1B is a block diagram illustrating an implementation of a data storage system, in accordance with some embodiments.

FIG. 1B is a block diagram illustrating an implementation of a data storage system 100, in accordance with some embodiments. While some exemplary features are illustrated, various other features have not been illustrated for the sake of brevity and so as not to obscure more pertinent aspects of the example implementations disclosed herein. To that end, as a non-limiting example, data storage system 100 includes storage device 120, which includes host interface 122, serial presence detect (SPD) device 124, data hardening circuitry 126, memory controller 128, one or more NVM controllers (e.g., NVM controller(s) 130), and NVM (e.g., one or more NVM device(s) 140, 142), and is used in conjunction with computer system 110. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some implementations, data hardening circuitry 126 is used to transfer data from volatile memory to NVM during a power failure condition, and includes one or more processing units (also sometimes called CPUs or processors or microprocessors or microcontrollers) configured to execute instructions in one or more programs (e.g., in data hardening circuitry 126). Data hardening circuitry 126 is coupled to host interface 122, SPD device 124, memory controller 128, and NVM controllers 130 in order to coordinate the operation of these components, including supervising and controlling functions such as power up, power down, data hardening, charging energy storage device(s), data logging, and other aspects of managing functions on storage device 120.

Memory controller 128 is coupled to host interface 122, data hardening circuitry 126, and NVM controllers 130. In some implementations, during a write operation, memory controller 128 receives data from computer system 110 through host interface 122 and during a read operation, memory controller 128 sends data to computer system 110 through host interface 122. Further, host interface 122 provides additional data, signals, voltages, and/or other information needed for communication between memory controller 128 and computer system 110. In some embodiments, memory controller 128 and host interface 122 use a defined interface standard for communication, such as double data rate type three synchronous dynamic random access memory (DDR3). In some embodiments, memory controller 128 and NVM controllers 130 use a defined interface standard for communication, such as serial advance technology attachment (SATA). In some other implementations, the device interface used by memory controller 128 to communicate with NVM controllers 130 is SAS (serial attached SCSI), or other storage interface. In some implementations, memory controller 128 includes one or more processing units (also sometimes called CPUs or processors or microprocessors or microcontrollers) configured to execute instructions in one or more programs (e.g., in memory controller 128).

SPD device 124 is coupled to host interface 122 and data hardening circuitry 126. Serial presence detect (SPD) refers to a standardized way to automatically access information about a computer memory module (e.g., storage device 120). For example, if the memory module has a failure, the failure can be communicated with a host system (e.g., computer system 110) through SPD device 124.

Figure 2:
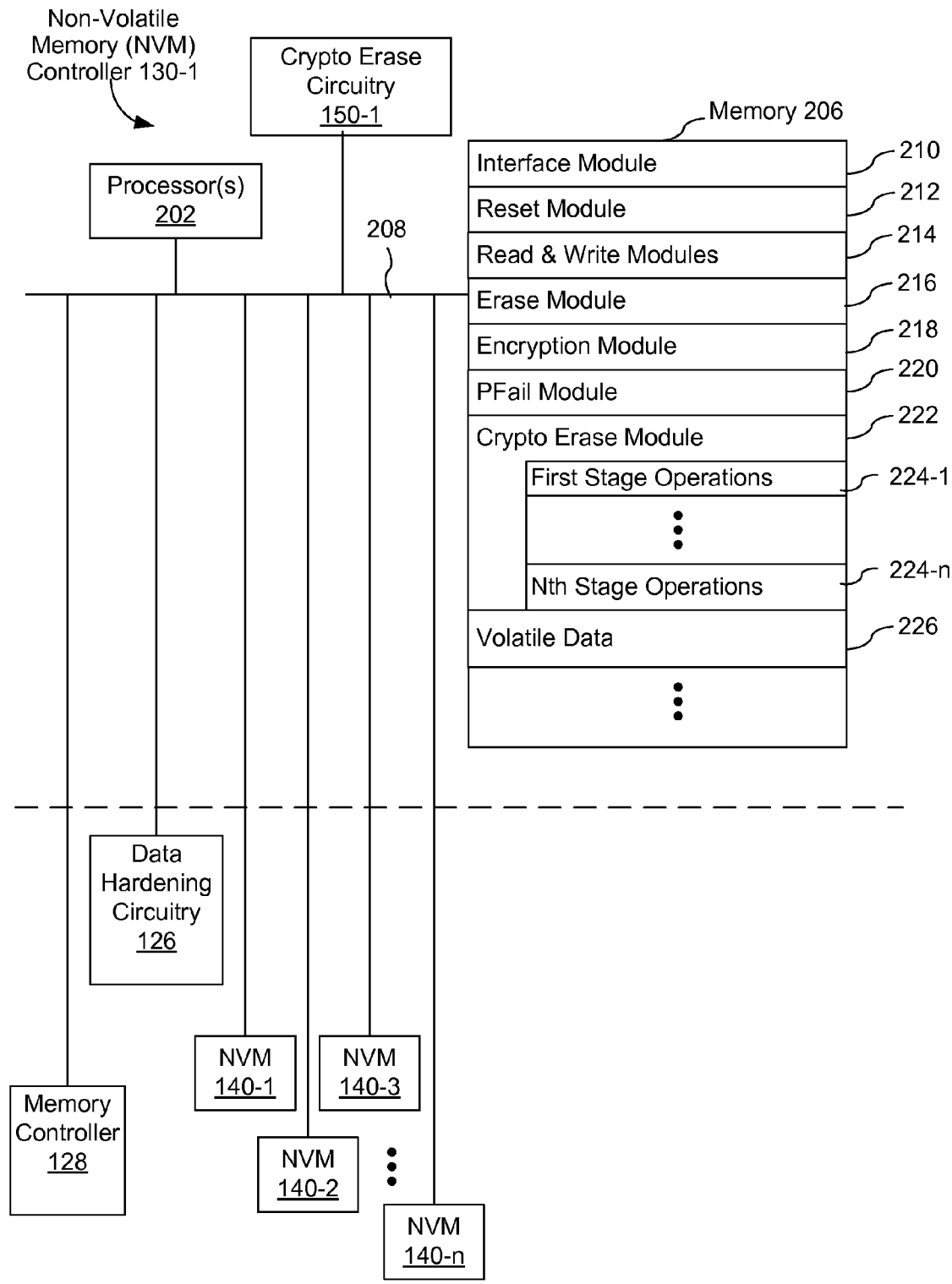
FIG. 2 is a block diagram illustrating an implementation of a non-volatile memory controller, in accordance with some embodiments.

FIG. 2 is a block diagram illustrating an implementation of an NVM controller 130-1, in accordance with some embodiments. NVM controller 130-1 typically includes one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. In some implementations, NVM controller 130-1 also includes crypto erase circuitry 150-1. In some embodiments, NVM controller 130-1 is coupled to memory controller 128, data hardening circuitry 126 (if present), and NVM devices 140 (e.g., NVM devices 140-1 through 140-n) by communication buses 208. Memory 206 includes high-speed random access memory, such as DRAM, SRAM, DDR RAM or other random access solid state memory devices, and may include NVM, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the NVM device(s) within memory 206, comprises a non-transitory computer readable storage medium. In some embodiments, memory 206, or the computer readable storage medium of memory 206 stores the following programs, modules, and data structures, or a subset thereof:

- interface module 210 that is used for communicating with other components, such as memory controller 128, data hardening circuitry 126, and NVM devices 140;
- reset module 212 that is used for resetting NVM controller 130-1;
- one or more read and write modules 214 used for reading from and writing to NVM devices 140;
- erase module 216 that is used for erasing portions of memory on NVM devices 140;
- encryption module 218 that is used for encrypting data on NVM devices 140;
- power failure module 220 that is used for detecting a power failure condition on the storage device (e.g., storage device 120, FIG. 1A) and triggering storage of data in volatile memory to NVM;

crypto erase module 222 that is used for performing crypto erase operations (also called cryptographic erase operations) on NVM devices 140; and volatile data 226 including volatile data associated with NVM controller 130-1.

In some embodiments, crypto erase module 222 includes instructions for one or more sets of operations for different operational stages (e.g., first stage operations 224-1 to n-th stage operations 224-n) of a crypto erase process. Each set of operations comprises one or more operations corresponding to a respective stage of the crypto erase operations performed by crypto erase module 222 on NVM devices 140.

In some embodiments, crypto erase module 222 is used to obtain one or more encryption keys, store one or more encryption keys to NVM, initiate an encryption of one or more encryption keys, and select a current encryption key.

Figure 3:
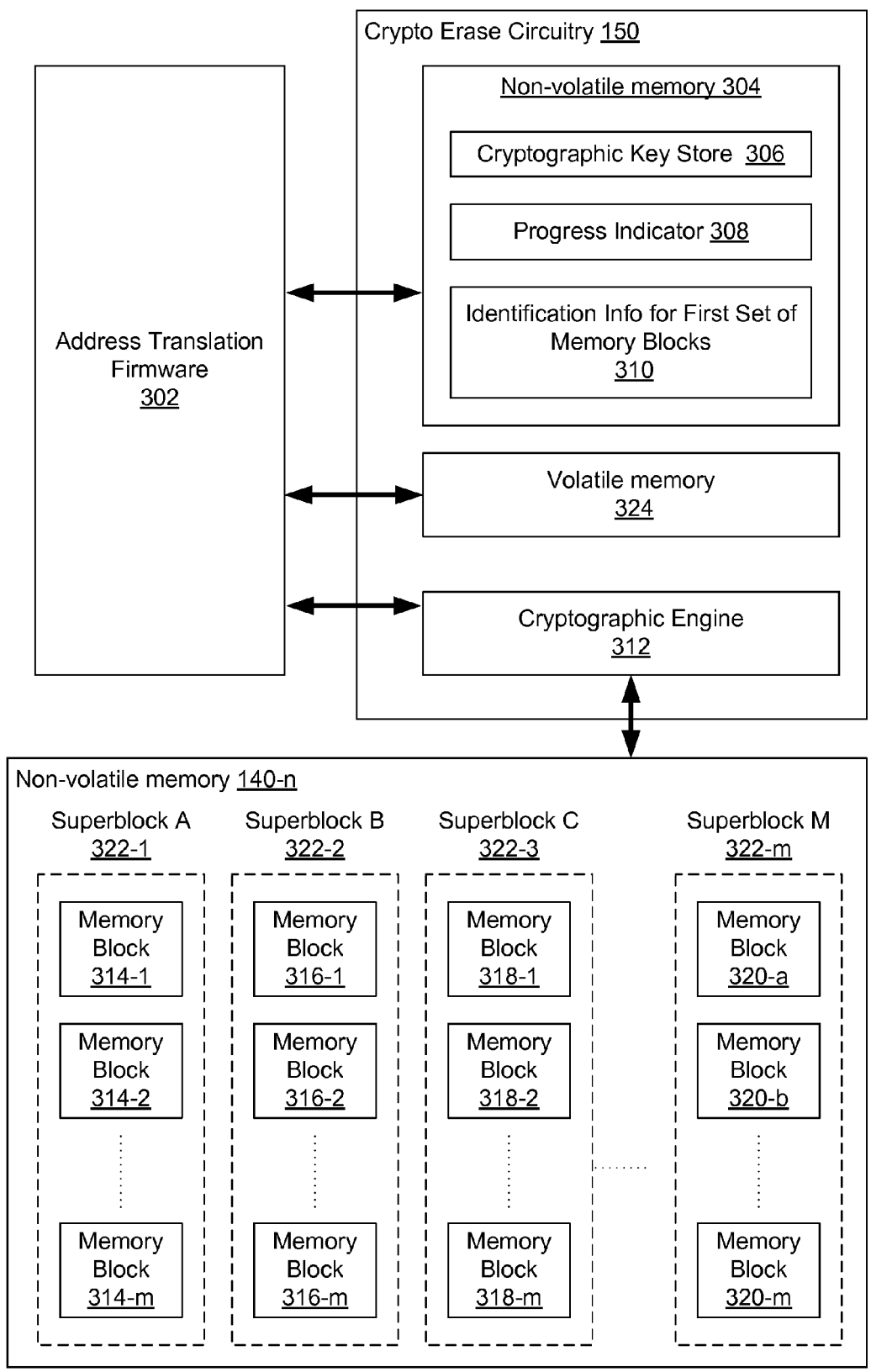
FIG. 3 is a block diagram illustrating an implementation of crypto erase circuitry, in accordance with some embodiments.

In some embodiments, crypto erase module 222 is configured to update a progress indicator (e.g., progress indicator 308 in crypto erase circuitry 150, FIG. 3).

In some embodiments, crypto erase module 222 is configured to select or identify a first set of memory blocks and a second set of memory blocks of a plurality of memory blocks. For details, see description of operation 506 below with respect to FIG. 5A.

Each of the above identified elements may be stored in one or more of the previously mentioned storage devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, include instructions for implementing respective operations in the methods described below with reference to FIGS. 5A-5C and 6.

Although FIG. 2 shows NVM controller 130-1 in accordance with some embodiments, FIG. 2 is intended more as a functional description of the various features which may be present in an NVM controller than as a structural schematic of the embodiments described herein. In practice, and as recognized by those of ordinary skill in the art, items shown separately could be combined and some items could be separated. Further, although FIG. 2 shows NVM controller 130-1, the description of FIG. 2 similarly applies to other NVM controllers (e.g., NVM controller 130-m) in storage device 120 (FIG. 1A).

FIG. 3 is a block diagram illustrating an implementation of crypto erase circuitry 150, in accordance with some embodiments. While some exemplary features are illustrated, various other features have not been illustrated for the sake of brevity and so as not to obscure more pertinent aspects of the example implementations disclosed herein. To that end, as a non-limiting example, crypto erase circuitry 150 interfaces with address translation firmware 302 (sometimes called FTL or Flash translation layer firmware) for handling logical to physical address translation, and maintaining associated translation tables (not shown). Further, in accordance with this example, crypto erase circuitry 150 includes NVM 304, volatile memory 324 and cryptographic engine 312. In some implementations, NVM 304 includes cryptographic key store 306, progress indicator 308 and identification information 310 for a first set of memory blocks. In some implementations, NVM 304 also includes storage for data in a transitional state during a cryptographic erase operation (e.g., metadata temporarily stored in volatile memory 324), in the case where a power failure condition is experienced by storage device 120. In some implementations, one or more of data objects 306, 308 and 310 are stored in NVM outside of the crypto erase circuitry 150, such as on NVM device 140. In some implementations, one or more of data objects 306, 308 and 310 are stored in distinct NVM devices, and in some implementations, all of data objects 306, 308 and 310 are stored in the same NVM device. In some embodiments, volatile memory 324 is random access memory, such as DRAM, SRAM, DDR RAM or other random access solid state memory. In some embodiments, volatile memory 324 stores decrypted metadata corresponding to one or more memory blocks, where a memory block is a predefined portion of memory (e.g., memory block 314-2) of the one or more storage devices communicatively coupled to crypto erase circuitry 150.

In some embodiments, one or more NVM controllers 130 (FIG. 1A) include crypto erase circuitry 150. In some embodiments, storage device 120 (FIG. 1A) includes crypto erase circuitry 150, but crypto erase circuitry 150 is not included in one or more NVM controllers 130. In some embodiments, address translation firmware 302 acts as an interface between the components of crypto erase circuitry 150, and circuitry outside of crypto erase circuitry 150. Address translation firmware 302 transmits and receives communications from a host computer (e.g., computer system 110, FIG. 1A), such as a request to read or write specified data, or to perform a cryptographic erase operation on one or more non-volatile memory (e.g., NVM devices 140, 142 in FIG. 1A). In some embodiments, address translation firmware 302 is configured to access NVM 304, for instance to read or write a cryptographic key to cryptographic key store 306. In some embodiments, crypto erase circuitry 150 utilizes the Advanced Encryption Standard (AES), and therefore cryptographic key store 306 stores one or more AES cryptographic keys. In some embodiments, address translation firmware 302 is configured to access volatile memory 324, for instance to store decrypted metadata information for memory blocks in NVM device 140-n. In some embodiments, one or more cryptographic keys are stored in cryptographic key store 306 in an encrypted format.

In some embodiments, crypto erase circuitry 150 is communicatively coupled with one or more non-volatile memory (e.g., NVM device 140-n). In some embodiments, cryptographic engine 312 of crypto erase circuitry 150 is in direct communication with one or more non-volatile memory (e.g., NVM device 140-n). In some implementations, cryptographic engine 312 encrypts data written to and decrypts data read from memory blocks in NVM device 140-n, using one or more cryptographic keys stored in cryptographic key store 306. In some embodiments, cryptographic engine 312 includes its own non-volatile memory for storing one or more cryptographic keys, and cryptographic engine 312 encrypts data written to and decrypts data read from memory blocks in NVM device 140-n, using a cryptographic key stored in cryptographic engine 312. In some embodiments, crypto erase circuitry 150 utilizes the Advanced Encryption Standard (AES), in which case cryptographic engine 312 is called an AES cryptographic engine. In some embodiments, cryptographic engine 312 generates one or more cryptographic keys to store in cryptographic key store 306. In some embodiments, cryptographic engine 312 includes one or more key slots, and each key slot is configured to store a single cryptographic key for use by the cryptographic engine 312. In some embodiments, NVM in cryptographic engine 312 implement the one or more key slots of cryptographic engine 312.

In FIG. 3, exemplary NVM device 140-n includes several memory blocks such as 314-1 to 314-m, 316-1 to 316-m, 318-1 to 318-m and 320-a to 320-m. In some implementations, memory blocks on NVM device 140-n are grouped into larger units called superblocks. For instance, superblock A 322-1 comprises memory blocks 314-1 to 314-m and superblock B comprises memory blocks 316-1 to 316-m.

In some implementations, the one or more non-volatile memory (e.g., NVM device 140-n) store metadata corresponding to each superblock on the device. For example, NVM device 140-n stores metadata for superblock A 322-1, for superblock B 322-2, etc. In some implementations, each superblock stores the metadata for the superblock. For example, superblock A 322-1 stores metadata for superblock A 322-1, superblock B 322-2 stores metadata for superblock B 322-2, etc. In some embodiments, each memory block stores metadata for the memory block. For example, memory block 314-1 stores metadata for memory block 314-1, memory block 314-2 stores metadata for memory block 314-2, etc. The metadata typically includes information corresponding to the history and/or health of a corresponding memory block or superblock. For example, in some embodiments, metadata includes a number of erase cycles performed on a memory block.

FIG. 4 is a table 400 illustrating several states of data in various volatile and NVM storage locations in an exemplary NVM device (e.g., NVM device 140-n, FIG. 3), while performing a cryptographic erase operation, such as in the methods described below with reference to FIGS. 5A-5C and 6. FIG. 4 illustrates a set of states 402 to 422, for data fields in volatile and NVM in the crypto erase circuitry 150 (see FIG. 3) and one or more non-volatile memory (e.g., NVM device 140-n, FIG. 3). For example, the data field "Stage" indicates a particular stage in the series of operations performed during a method of cryptographically erasing data in one or more storage devices. In some implementations, the data field "Stage" is stored in Progress Indicator 308 (see FIG. 3), in NVM 304 (see FIG. 3). Progress Indicator 308 typically indicates a current stage of the cryptographic erase operation. In some embodiments, Progress Indicator 308 (see FIG. 3) is a binary value stored in NOR flash memory to represent the current stage of the cryptographic erase operation. The data field "Cryptographic Key" in FIG. 4 represents one or more encryption keys included in Cryptographic Key Store 306 (see FIG. 3). In some implementations, Cryptographic Key Store 306 (see FIG. 3) is stored in NOR flash memory. In some implementations, Cryptographic Key Store 306 is stored in the same NOR flash memory as Progress Indicator 308.

The data field "Volatile Memory" indicates the presence or absence of decrypted metadata corresponding to a first set of memory blocks and a second set of memory blocks on some volatile memory in crypto erase circuitry 150 (see FIG. 3). In some embodiments, "Volatile Memory" corresponds to volatile memory 324 (see FIG. 3) of crypto erase circuitry 150, and in some instances "Volatile Memory" corresponds to random access memory, such as DRAM, SRAM, DDR RAM or other random access solid state memory.

The data field "First Set of Memory Blocks" indicates the state of data written into a first set of memory blocks in one or more non-volatile memory (e.g., superblock A 322-1 in NVM 140-n, FIG. 3). In some implementations, the first set of memory blocks is a single superblock (e.g., superblock A 322-1 or superblock B 322-2, FIG. 3) in a NVM device (e.g., NVM 140-n). In some implementations, the first set of memory blocks includes multiple superblocks in one or more non-volatile memory (e.g., superblock A 322-1 and superblock B 322-2). In some embodiments, the first set of memory blocks (e.g., superblock A 322-1, FIG. 3) comprises a dedicated portion of memory for storing metadata, and the remaining portion of memory for data other than metadata (e.g., host data that has been received from a host system, such as financial information, music files, digital photos). In some implementations, the first set of memory blocks is a subset of memory blocks queued up for the cryptographic erase operation described herein. In some embodiments, the set of memory blocks queued up for the cryptographic erase operation cease to store any host data until completion of the cryptographic erase operation.

The data field "Second Set of Memory Blocks" indicates the state of data written into a second set of memory blocks in one or more non-volatile memory (e.g., superblocks B through M in NVM device 140-n, FIG. 3). In some implementations, the second set of memory blocks is one or more superblocks (e.g., superblock B 322-2, superblock C 322-3 through superblock M 322-m) in a NVM device (e.g., NVM 140-n). In some embodiments, each block or superblock of the second set of memory blocks comprises a dedicated portion of memory for respectively storing its metadata, and the remaining portion of memory for data other than metadata. In some embodiments, the first set of memory blocks comprises a single memory block or superblock, and the second set of memory blocks comprises hundreds, thousands or tens of thousands of memory blocks or superblocks. In such implementations, the collective set of metadata for the second set of memory blocks is magnitudes larger in storage size than the set of metadata for the first set of memory blocks.

With respect to the data fields "First Set of Memory Blocks" and "Second Set of Memory Blocks," in some embodiments, the state "Data" refers to the presence of non-metadata (also sometimes called "data other than metadata" or "encrypted data other than metadata"), such as host data, which is typically stored in an encrypted format. In some embodiments, the state "Erased" refers to a state in which a portion of corresponding memory blocks has been physically erased. In some embodiments, the state "Crypto Erased" refers to a state in which data (i.e., encrypted data) stored in a portion of the corresponding memory blocks has been rendered undecipherable (e.g., through the unavailability of a corresponding encryption key), and thus effectively inaccessible or unreadable, but not physically erased.

The data field "Power Fail NVM" indicates the state of data written into a NVM location (e.g., NVM 304, FIG. 3), reserved for storing metadata not completely written to another NVM (e.g., the first set of memory blocks/superblock) at the time a power failure situation is detected. In some embodiments, a power failure situation is detected in accordance with a determination that a power supply voltage to the storage device (e.g., storage device 120, FIG. 1A) is lower than a predefined under-voltage threshold. The data field "Power Fail" is a reference for whether or not a power failure situation is or has been detected during a respective state (e.g., states 402 through 422). Table 400 and the various data fields and states 402 through 422 will be used to describe the operations shown in FIGS. 5A-5C.

Figure 5A:
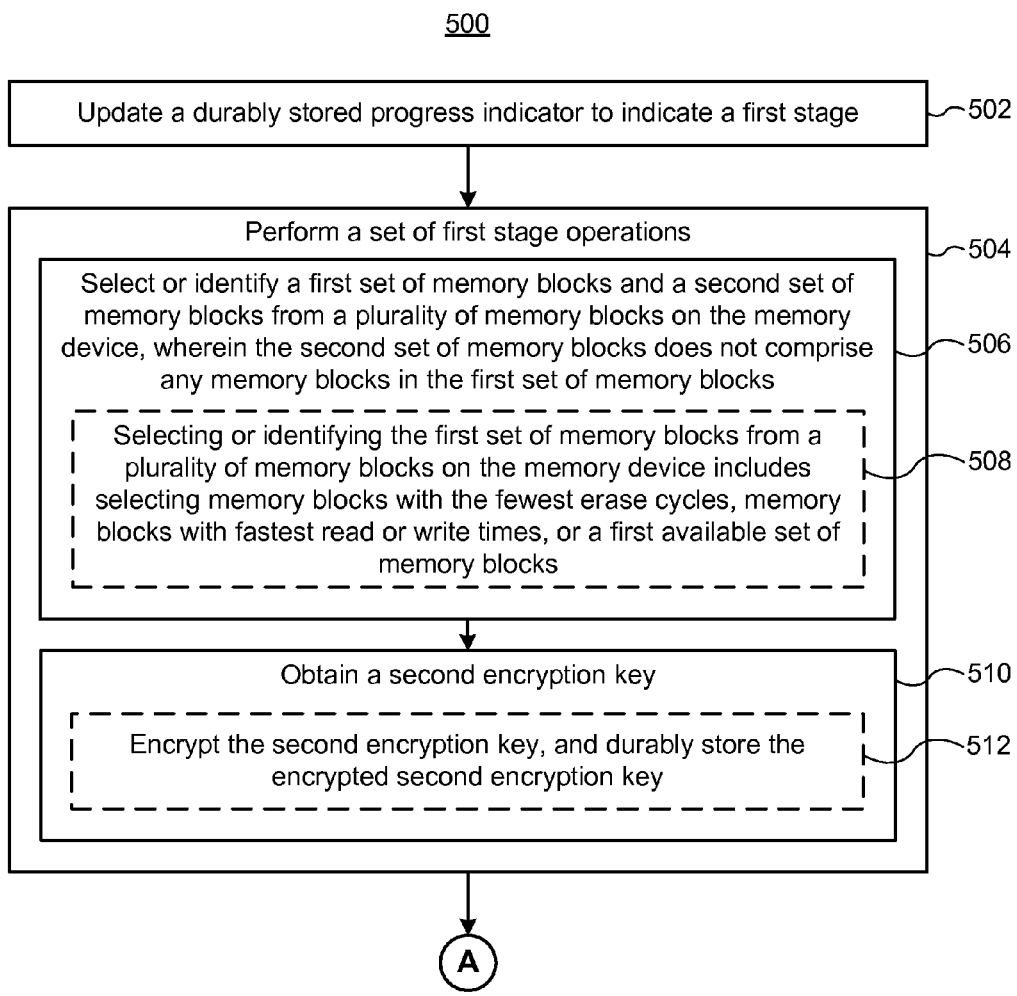
FIGS. 5A-5C illustrate a flowchart representation of a method of cryptographically erasing data in a storage device, in accordance with some embodiments.
Figure 5B:
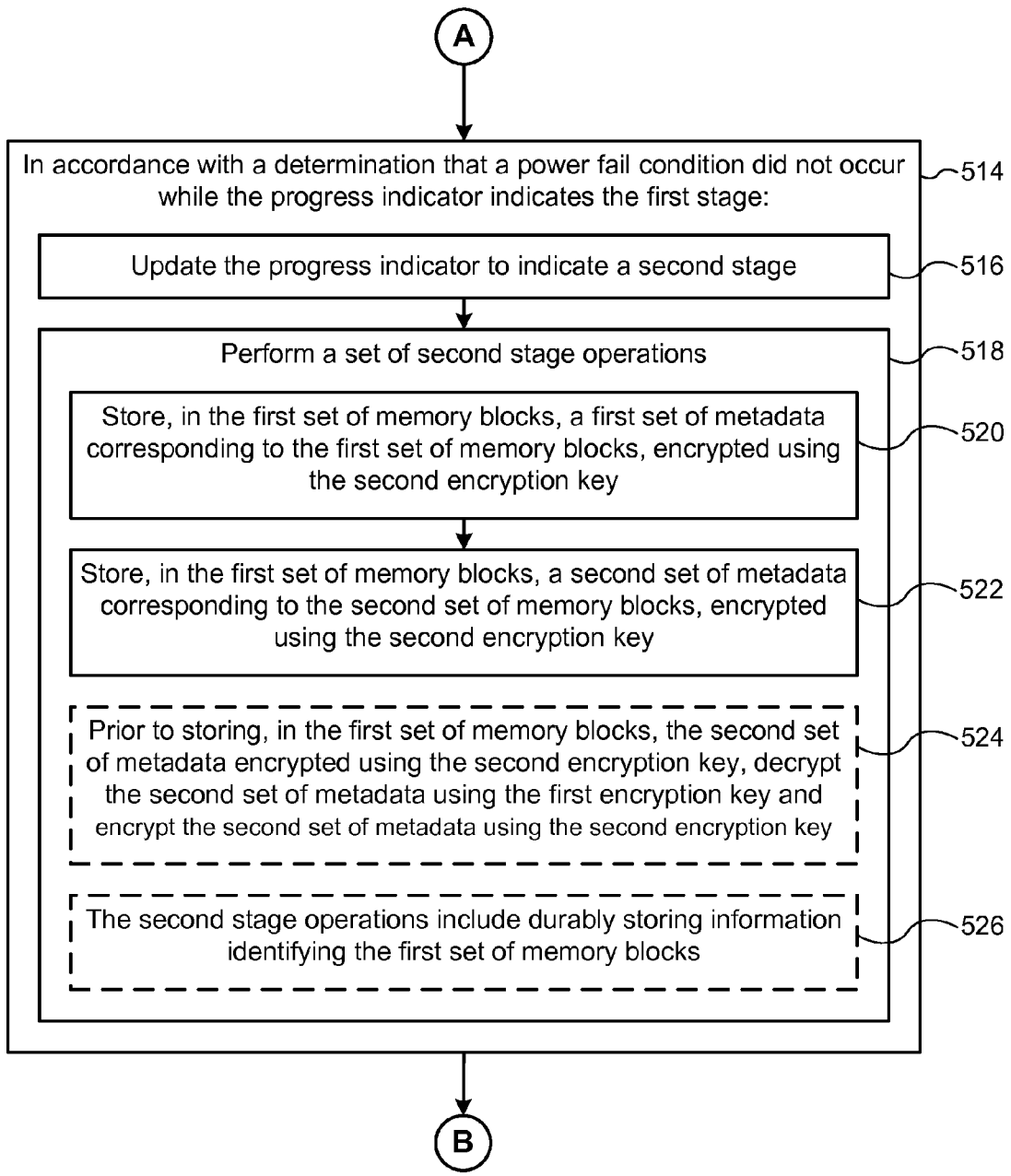
Figure 5C:
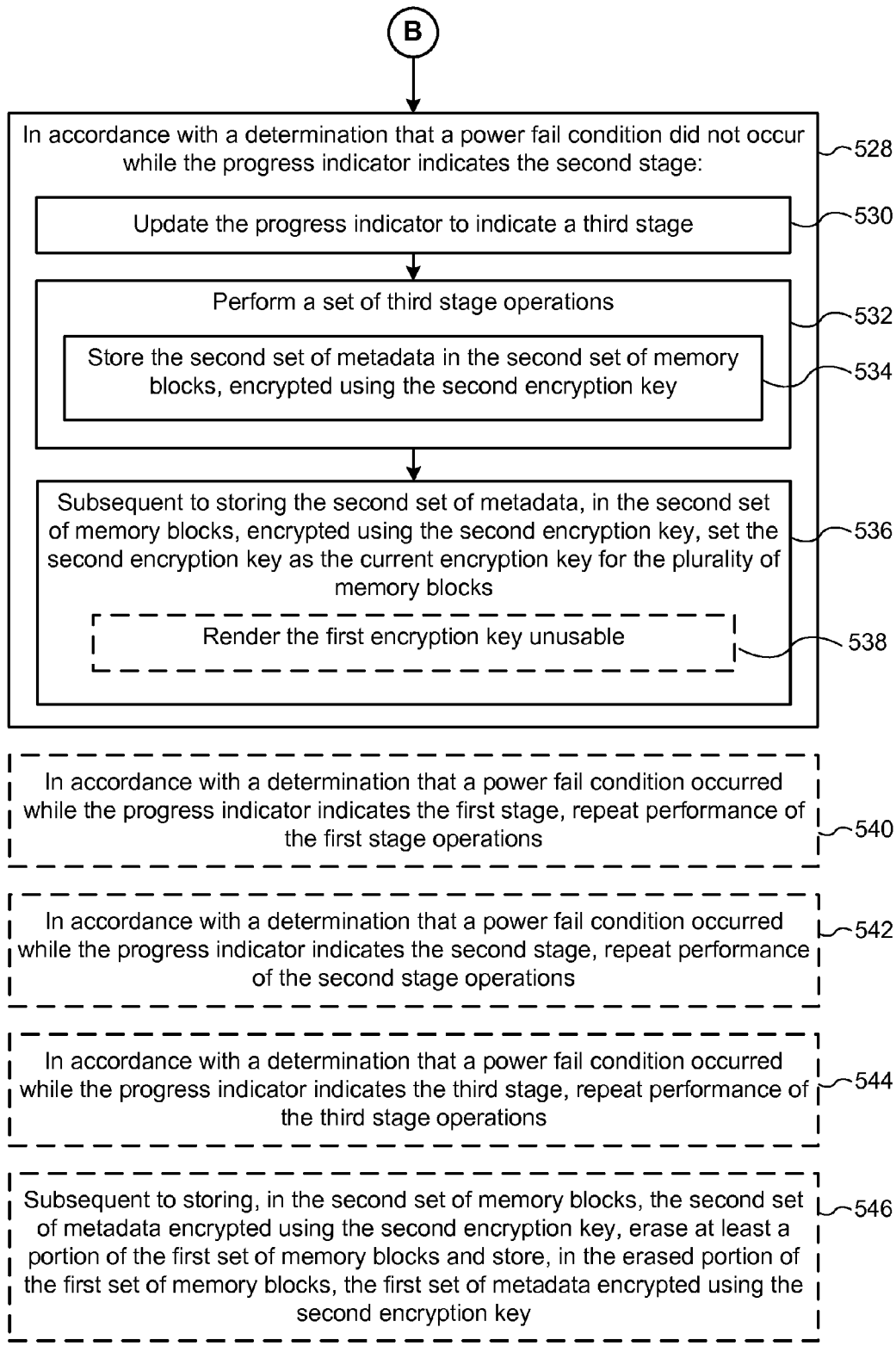

FIGS. 5A-5C illustrate a flowchart representation of method 500 of cryptographically erasing data in a storage device, in accordance with some embodiments. In some embodiments, the storage device (e.g., storage device 120, FIG. 1A) coordinates and manages multiple sub-system components to cryptographically erase data. At least in some implementations, method 500 is performed by a storage device (e.g., storage device 120, FIG. 1A) or one or more components of the storage device (e.g., NVM controllers 130 and/or crypto erase circuitry 150, FIG. 1A). In some embodiments, method 500 is governed by instructions that are stored in a non-transitory computer readable storage medium and that are executed by one or more processors of a device, such as the one or more processors 202 of NVM controllers 130, as shown in FIG. 2.

The storage device (e.g., storage device 120, FIG. 1A) has a first encryption key established as a current encryption key (e.g., Key 1 in Cryptographic Key data field in table 400 in FIG. 4).

In some embodiments, the storage device updates (502) a durably stored progress indicator to indicate a first stage. For example, in some embodiments, an NVM controller (e.g., NVM controller 130-1) updates the durably stored progress indicator to indicate that the NVM controller is in a first stage of crypto erase operation. In some embodiments, the durably stored progress indicator is progress indicator 308 stored in NVM 304 (e.g., NOR or NAND flash or EEPROM) in FIG. 3. In some embodiments, updating the durably stored progress indicator to indicate the first stage includes storing a binary value, an integer value or decimal value to indicate a first stage of progress (e.g., integer value "1" in data field "Stage" in FIG. 4). In some embodiments, the first encryption key is stored in NVM (e.g., in cryptographic key store 306 in NVM 304 in FIG. 3). In some embodiments, the first encryption key is stored in an encrypted format. In some embodiments, the first encryption key is encrypted using an encryption key (called herein a key encryption key) distinct from the first encryption key. In some embodiments, upon power-up of the storage device, the storage device decrypts an encrypted first encryption key with the key encryption key (e.g., using cryptographic engine 312). In some embodiments, encryption keys stored in NVM (e.g., in cryptographic key store 306) are encrypted (e.g., using the key encryption key). In some embodiments, prior to updating the durably stored progress indicator to indicate the first stage, the durably stored progress indicator indicates that a corresponding NVM controller is not in a crypto erase operation (e.g., by indicating zero or null value).

In some embodiments, cryptographic engine 312 includes one or more key slots. In some embodiments, one encryption key, of one or more encryption keys, in the one or more key slots is called a current key, and cryptographic engine 312 performs encryption and/or decryption using the current key. In some embodiments, an encryption key in a first key slot of cryptographic engine 312 is deemed to be a current key.

The storage device performs (504) a set of first stage operations. In some embodiments, the first stage operations include selecting (506) or identifying a first set of memory blocks and a second set of memory blocks from a plurality of memory blocks on the storage device. The second set of memory blocks does not comprise any memory block in the first set of memory blocks. For example, in some embodiments, the storage device selects or identifies superblock A 322-1 in NVM device 140-n (FIG. 3) as the first set of memory blocks and superblock B (322-2) through superblock M (322-m) as the second set of memory blocks. In this example, the second set of memory blocks (superblocks B 322-2 through superblock M 322-m) does not include any memory block in the first set of memory blocks (superblock A 322-1). In some embodiments, every memory block of the second set of memory blocks includes a subset of the metadata for the second set of memory blocks (e.g., a first memory block of the second set of memory blocks stores metadata for the first memory block, and a second memory block of the second set of memory blocks stores metadata for the second memory block etc.). In some other embodiments, a single memory block of the second set of memory blocks stores the entire metadata for the second set of memory blocks. In some other embodiments, a subset of the second set of memory blocks having multiple memory blocks, but fewer than all the memory blocks in the second set of memory blocks, stores the entire metadata for the second set of memory blocks.

In some embodiments, selecting or identifying the first set of memory blocks from a plurality of memory blocks on the storage device includes (508) selecting one or more memory blocks with the fewest erase cycles, memory blocks with fastest read or write times, or a first available set of memory blocks.

In some embodiments, selecting or identifying the first set of memory blocks and the second set of memory blocks from the plurality of memory blocks on the storage device includes identifying the first set of memory blocks that has been preselected. In some embodiments, selecting or identifying the second set of memory blocks includes identifying memory blocks so that the second set of memory blocks does not include any memory block in the first of memory blocks.

State 402 shown in FIG. 4 represents the state of the storage device (or the NVM controller) upon selecting or identifying the first set of memory blocks and the second set of memory blocks from the plurality of memory blocks on the storage device in accordance with some embodiments. The first set of memory blocks includes a first set of metadata, for the first set of memory blocks, encrypted using the first encryption key. In some embodiments, the first set of memory blocks also includes data (e.g., host data), if any, encrypted using the first encryption key. The second set of memory blocks includes a second set of metadata, for the second set of memory blocks, encrypted using the first encryption key. In some embodiments, the second set of memory blocks also includes data (e.g., host data), if any, encrypted using the first encryption key. Although state 402 shown in FIG. 4 illustrates that volatile memory stores decrypted first and second sets of metadata, in some embodiments, the volatile memory does not store decrypted first and second sets of metadata upon selecting or identifying the first set of memory blocks and the second set of memory blocks from the plurality of memory blocks on the storage device.

The first stage operations include (510) obtaining a second encryption key. In some embodiments, obtaining the second encryption key includes generating the second encryption key. In some embodiments, obtaining the second encryption key further includes (512) encrypting the second encryption key and durably storing the encrypted second encryption key (e.g., in cryptographic key store 306, FIG. 3). In some embodiments, the second encryption key is encrypted using a key encryption key distinct from the second encryption key. In some embodiments, upon power-up of the storage device, the storage device decrypts an encrypted second encryption key the second encryption key is recovered by decrypting it with the key encryption key. In such embodiments, each "encryption key" that is stored in NVM (e.g., in cryptographic key store 306) is actually the corresponding encrypted encryption key. In some embodiments, the second encryption key is deemed to be the current key, because the second encryption key is in the first key slot of cryptographic engine 312.

State 403 shown in FIG. 4 represents the state of the storage device (or the NVM controller) upon obtaining the second encryption key in accordance with some embodiments.

In accordance with a determination (514, FIG. 5B) that a power fail condition did not occur while the progress indicator indicates the first stage, the storage device updates (516) the progress indicator to indicate a second stage. In some embodiments, the NVM controller (e.g., NVM controller 130-1) updates the durably stored progress indicator to indicate that the NVM controller is in the second stage of crypto erase operation. In some embodiments, updating the durably stored progress indicator to indicate the second stage includes storing a binary value, an integer value or decimal value to indicate the second stage of operation (e.g., integer value "2" in data field "Stage" in FIG. 4). State 404 shown in FIG. 4 represents the state of the storage device (or the NVM controller) upon updating the progress indicator to indicate the second stage.

The storage device performs (518) a set of second stage operations. The second stage operations include (520) storing, in the first set of memory blocks, a first set of metadata, corresponding to the first set of memory blocks, encrypted using the second encryption key (e.g., Key 2, FIG. 4).

In some embodiments, the first set of metadata encrypted using the first encryption key is initially stored in a portion of the first set of memory blocks reserved for metadata. In some embodiments, storing, in the first set of memory blocks, the first set of metadata encrypted using the second encryption key includes storing that metadata into the portion of the first set of memory blocks reserved for metadata. For example, with reference to FIG. 4, in a transition from state 404 to state 406, the first set of metadata is initially encrypted with the first encryption key (e.g., Key 1), and is stored in the metadata portion of the first set of memory blocks (e.g., as represented by state 404).

In some embodiments, intermediate erase operations occur on the first set of memory blocks before storing, in the first set of memory blocks, the first set of metadata encrypted using the second encryption key. For example, as illustrated in state 405, the storage device erases the first set of memory blocks prior to storing the first set of metadata encrypted using the second encryption key in the first set of memory blocks. In some other embodiments, only a subset of the first set of memory blocks is erased prior to storing the first set of metadata encrypted using the second encryption key in the first set of memory blocks.

The method further includes storing (522), in the first set of memory blocks, a second set of metadata, corresponding to the second set of memory blocks, encrypted using the second encryption key. In some embodiments, before storing, in the first set of memory blocks, a second set of metadata, corresponding to the second set of memory blocks, encrypted using the second encryption key, the second set of memory blocks stores a second set of metadata encrypted using the first encryption key (e.g., as shown in state 406, FIG. 4). In some embodiments, the second set of metadata encrypted using the first encryption key is stored in a portion of the second set of memory blocks reserved for metadata. In some embodiments, storing, in the first set of memory blocks, the second set of metadata encrypted using the second encryption key includes storing the second set of metadata into a portion of the first set of memory blocks reserved for non-metadata information (e.g., state 407, FIG. 4). For example, state 407 in FIG. 4 illustrates that the second set of metadata encrypted with Key 1 is stored in the metadata portion of the second set of memory blocks, and the second set of metadata is also stored in volatile memory in a decrypted format. State 407 also shows that the second set of metadata retrieved from volatile memory is encrypted using the second encryption key and stored in the non-metadata portion of the first set of memory blocks.

In some embodiments, the set of second stage operations includes, prior to storing, in the first set of memory blocks, the second set of metadata encrypted using the second encryption key, decrypting (524) the second set of metadata using the first encryption key and encrypting the second set of metadata using the second encryption key. For example, the storage device decrypts the second set of metadata, encrypted using the first key, with the first key; stores the decrypted metadata in volatile memory; encrypts the decrypted metadata using the second encryption key; and stores the second set of metadata, encrypted using the second encryption key, in the first set of memory blocks. In some embodiments, the storage device decrypts the second set of metadata using the first encryption key while reading the second set of metadata, encrypted using the first encryption key, from the second set of memory blocks, and encrypts the second set of metadata using the second encryption key while storing the first set of memory blocks without writing to the volatile memory.

In some embodiments, the set of second stage operations includes durably storing (526) information identifying the first set of memory blocks. For example, the address or identification of the first set of memory blocks is stored to Identification Info for First Set of Memory Blocks 310 in NVM 304 (FIG. 3). This information allows for retrieval of a durably stored copy of the second set of metadata from the first set of memory blocks, in case of a power failure before the second set of metadata, encrypted with the second encryption key, is stored in the second set of memory blocks.

The storage device, in accordance with a determination (528, FIG. 5C) that a power fail condition did not occur while the progress indicator indicates the second stage, updates (530) the progress indicator to indicate a third stage. In some embodiments, the NVM controller (e.g., NVM controller 130-1) updates the durably stored progress indicator to indicate that the NVM controller is in the third stage of crypto erase operation. In some embodiments, updating the durably stored progress indicator to indicate the third stage includes storing a binary value, an integer value or decimal value to indicate the third stage of operation (e.g., integer value "3" in data field "Stage" in FIG. 4). State 412 shown in FIG. 4 represents the state of the storage device (or the NVM controller) upon updating the progress indicator to indicate the third stage in accordance with some embodiments.

The storage device then performs (532) a set of third stage operations, including storing (534) the second set of metadata in the second set of memory blocks encrypted using the second encryption key. In some embodiments, one or more intermediate erase operations occur on at least a portion of the second set of memory blocks before storing, on the second set of memory blocks, the second set of metadata encrypted using the second encryption key. For example, with reference to FIG. 4, in state 412, the second set of memory blocks includes data in the metadata and the non-metadata portions of the memory blocks. In some embodiments, the metadata portion of the second set of memory blocks includes one or more memory blocks, and the non-metadata portion of the second set of memory blocks includes a plurality of memory blocks that do not include any memory block in the metadata portion of the second set of memory blocks. In some embodiments, at least a portion of the second set of memory blocks is physically erased for storing data into the erased portion of the second set of memory blocks. For example, state 414 represents that the metadata portion of the second set of memory blocks has been erased. In some embodiments, the data portion of the second set of memory blocks is also erased in state 414. In some embodiments, the second set of memory blocks includes one or more superblocks, and the metadata portion and the non-metadata portion are located in separate and distinct memory blocks. In some embodiments, the storage device foregoes erasing the data portion of the second set of memory blocks prior to storing the second set of metadata, encrypted using the second encryption key, in the metadata portion of the second set of memory blocks. In such embodiments, the storage device erases the data portion of the second set of memory blocks subsequent to storing the second set of metadata, encrypted using the second encryption key, in the second set of memory blocks (operation 534) and prior to storing data in the data portion of the second set of memory blocks. State 416 represents that the second set of metadata, encrypted using the second encryption key, is stored in the metadata portion of the second set of memory blocks. In some embodiments, storing the second set of metadata, encrypted using the second encryption key, in the metadata portion of the second set of memory blocks includes copying the second set of metadata, encrypted using the second encryption key, from the first set of memory blocks. In some embodiments, storing the second set of metadata, encrypted using the second encryption key, in the metadata portion of the second set of memory blocks includes encrypting the decrypted second set of metadata, stored in volatile memory, using the second encryption key and storing the second set of metadata, encrypted using the second encryption key, in the second set of memory blocks.

In some embodiments, the storage device sets (536) the second encryption key as the current encryption key for the plurality of memory blocks. In some embodiments, the second encryption key is stored in NVM (e.g., in cryptographic key store 306 in NVM 304 in FIG. 3). In some embodiments, the second encryption key is stored in an encrypted format. In some embodiments, the storage device establishes that the second encryption key is the current key. In some embodiments, the second encryption key is deemed to be the current key, because the second encryption key is in the first key slot of cryptographic engine 312.

In some embodiments, setting the second encryption key as the current encryption key renders (538) the first encryption key unusable (e.g., the first encryption key is permanently deleted). In some embodiments, rendering the first encryption key unusable includes deleting the first encryption key in cryptographic key store 306. In some embodiments, rendering the first encryption key unusable includes deleting the first encryption key in cryptographic engine 312. In some embodiments, rendering the first encryption key unusable renders inaccessible any data, encrypted using the first encryption key, stored in the second set of memory blocks. This corresponds to cryptographically erasing the data stored in the second set of memory blocks. Because the data stored in the second set of memory blocks need not be physically erased, cryptographic erasure of the encrypted data in the second set of memory blocks is typically much faster than physically erasing the same data.

In some embodiments, the storage device updates the progress indicator to indicate a third stage after setting the second encryption key as the current encryption key for the plurality of memory blocks.

In some embodiments, in accordance with a determination that a power fail condition occurred while the progress indicator indicates the first stage, the storage device repeats (540) performance of the first stage operations. In some embodiments, in accordance with a determination that a power fail condition occurred at any stage in the method, the storage device repeats performance of the first stage operations, only in response to a host command instructing the storage device to do so.

In some embodiments, in accordance with a determination that a power fail condition occurred while the progress indicator indicates the second stage, the storage device repeats (542) performance of the second stage operations. In some embodiments, the second stage operations include erasing the first set of memory blocks. In these embodiments, if a power fail condition occurs in the second stage before storing the first set of metadata back to the first set of blocks, the metadata corresponding to the first set of blocks is at risk of being lost or destroyed. For example, with reference to FIG. 4, in state 405, the first set of memory blocks has been erased, therefore the only copy of the first set of metadata resides in volatile memory. In some embodiments, if a power failure condition occurs prior to state 406, the metadata portion of the first set of memory blocks remains in an erased state (if the power failure condition occurs before storing the first set of metadata encrypted using the second encryption key has begun). Alternatively, the metadata portion of the first set of memory blocks includes only a subset of the first set of metadata encrypted using the second encryption key if the power failure condition occurs during storage of the first set of metadata encrypted using the second encryption key, thereby affecting the integrity of the metadata stored in the metadata portion of the first set of memory blocks. In some embodiments, the decrypted first set of metadata stored in volatile memory is quickly stored in a NVM location reserved to preserve this first set of metadata in case of a power failure. This is reflected in state 410, which represents the state of the storage device (or the NVM controller) after the occurrence of a power failure during the performance of the second state of operations. As shown in FIG. 4, state 410 represents that the first set of metadata is stored in the Power Fail NVM when the second stage of operations is interrupted by a power failure. Furthermore, in state 410, the metadata portion of the first set of memory blocks includes a first set of metadata encrypted using the first encryption key, a first set of metadata encrypted using the second encryption key, a subset of the first set of metadata encrypted using the second encryption key, or no metadata (e.g., in an erased state), depending on when the power failure occurred during the second stage operations. In some embodiments, the first set of metadata is encrypted with the first encryption key upon storage in the NVM. In some embodiments, the storage device includes an energy storage device that stores energy for power failure operations, and the storage device stores the first set of metadata in the Power Fail NVM using energy from the energy storage device. In some embodiments, the energy storage device is included in intermediate modules 125, FIG. 1A.

In some embodiments, in accordance with a determination that a power fail condition occurred while the progress indicator indicates the third stage, the storage device repeats (544) performance of the third stage operations. In some embodiments, the third stage starts with the first set of metadata and the second set of metadata stored in the first set of memory blocks, and encrypted with the second encryption key. For example, with reference to FIG. 4, state 412 shows the presence of data at the beginning of the third stage. If a power failure condition occurs during the third stage, the decrypted copy of the first set of metadata in volatile memory is stored in the Power Fail NVM, but the decrypted copy of the second set of metadata in volatile memory is lost or destroyed (e.g., state 417, FIG. 4). In state 417, the metadata portion of the second set of memory blocks includes the second set of metadata encrypted using the first encryption key, the second set of metadata encrypted using the second encryption key, a subset of the second set of metadata encrypted using the second encryption key, or no metadata (e.g., in an erased state), depending on when the power failure occurred during the third stage operations. However, in such embodiments, the storage device recovers and restores the second set of metadata using the second set of metadata stored in the first set of memory blocks.

In some embodiments, after successfully storing, in the second set of memory blocks, the second set of metadata encrypted using the second encryption key (operation 534), the storage device erases (546) at least a portion of the first set of memory blocks and stores, in the erased portion of the first set of memory blocks, the first set of metadata encrypted using the second encryption key. In some embodiments, the storage device erases the first set of memory blocks and stores, in the first set of memory blocks, the first set of metadata encrypted using the second encryption key. For example, state 418 represents that the first set of memory blocks is erased, and state 420 represents that, in accordance with a determination that a power failure condition did not occur, the first set of metadata, retrieved from volatile memory, has been encrypted using the second encryption key and stored in the metadata portion of the first set of memory blocks. In some embodiments, these operations are deemed to be a fourth stage of the crypto erase operation. In some other embodiments, these operations are deemed to be part of the third stage of the crypto erase operation. If a power failure occurs at stage 418 (or prior to proceeding to state 420), the decrypted first set of metadata stored in volatile memory is quickly stored in the Power Fail NVM before the contents of volatile memory are lost. This is reflected in state 422, where the first set of metadata is stored in the Power Fail NVM. In some embodiments, the first set of metadata is encrypted with the second encryption key upon storage in the Power Fail NVM. Upon power-up, the storage device stores the first set of metadata using the first set of metadata stored in the Power Fail NVM.

Reference has been made to various crypto erase operations with respect to the first, second and third stages of the method. In some embodiments, operations described with respect to one stage are performed in another stage. In some embodiments, the crypto erase operation includes additional intermediate operations. Such intermediate stages allow for repetition of particular operations associated with a respective stage, in accordance with a determination that a power fail condition has occurred while the progress indicator indicates the respective stage.

Figure 6:
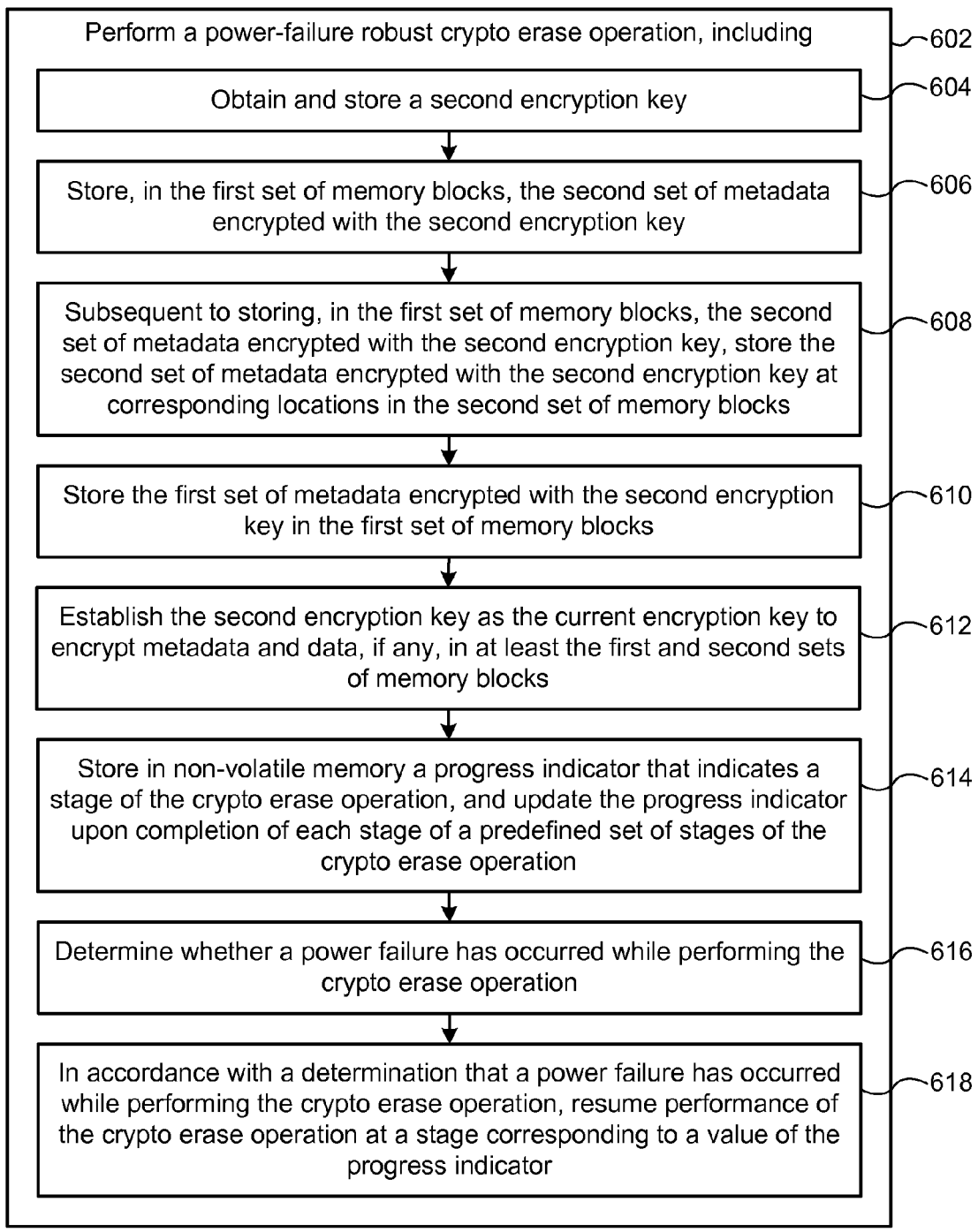
FIG. 6 illustrates a flowchart representation of a method of cryptographically erasing data in a storage device, in accordance with some embodiments.

FIG. 6 illustrates a flowchart representation of method 600 of cryptographically erasing data in a storage device, in accordance with some embodiments. A storage device has a first set of memory blocks and a second set of memory blocks. The first set of memory blocks stores a first set of metadata and the second set of memory blocks stores a second set of metadata. The storage device has a first encryption key established as a current encryption key, to encrypt metadata and data, if any, in at least the first and second sets of memory blocks. The storage device performs (602) a power-failure robust crypto erase operation, including obtaining (604) and storing a second encryption key. The storage device stores (606), in the first set of memory blocks, the second set of metadata encrypted with the second encryption key, and subsequent to storing, in the first set of memory blocks, the second set of metadata encrypted with the second encryption key, stores (608) the second set of metadata encrypted with the second encryption key at corresponding locations in the second set of memory blocks. The storage device stores (610) the first set of metadata encrypted with the second encryption key in the first set of memory blocks, and establishes (612) the second encryption key as the current encryption key to encrypt metadata and data, if any, in at least the first and second sets of memory blocks. Performing the crypto erase operation further includes storing (614) in NVM a progress indicator that indicates a stage of the crypto erase operation, and updating the progress indicator upon completion of each stage of a predefined set of stages of the crypto erase operation. The storage device also determines (616) whether a power failure has occurred while performing the crypto erase operation. The storage device, in accordance with a determination that a power failure has occurred while performing the crypto erase operation, resumes (618) performance of the crypto erase operation at a stage corresponding to a value of the progress indicator.

Some of the characteristics of method 500, described above with respect to FIGS. 5A-5C, are applicable to method 600. For example, in some embodiments, method 600 includes selecting or identifying a first set of memory blocks and a second set of memory blocks described above with respect to operations 506 and 508. In another example, in some embodiments, method 600 includes encrypting the second encryption key and storing encrypted second encryption key. For brevity, these details are not repeated herein.

In some implementations, with respect to any of the methods described above, the NVM is a single flash memory device, while in other implementations, the NVM includes a plurality of flash memory devices.

As described herein, methods 500 and 600 allow preservation of metadata in an encrypted format while deleting (i.e., cryptographically erasing and, optionally, physically deleting) non-metadata that has been encrypted using a same encryption key, such as a first encryption key. Methods 500 and 600 also allow replacing the metadata encrypted with the first encryption key with metadata encrypted with a second encryption key, thereby improving the security of the metadata. Furthermore, methods 500 and 600 are compatible with crypto erase operations, thereby enabling a fast erasure of encrypted data (e.g., non-metadata) stored in the storage device. Notably, methods 500 and 600 provide internal check points so that the crypto erase operation, in case of a power failure, resumes from one of the internal check points, thereby reducing the need for having to repeat the entire crypto erase operation and the risk of losing critical data (e.g., metadata).

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of cryptographically erasing data in a storage device, at a controller of the storage device, the storage device having a first encryption key established as a current encryption key prior to performance of the method, the method comprising:
   updating a durably stored progress indicator to indicate a first stage;
   performing a set of first stage operations, including:
      obtaining a second encryption key;
   in accordance with a determination that a power fail condition did not occur while the progress indicator indicates the first stage:
      updating the progress indicator to indicate a second stage;
      performing a set of second stage operations, including:
         storing, in a first set of memory blocks on the storage device, a first set of metadata corresponding to the first set of memory blocks, encrypted using the second encryption key; and
         storing, in the first set of memory blocks, a second set of metadata corresponding to a second set of memory blocks on the storage device, encrypted using the second encryption key; wherein the second set of memory blocks does not comprise any memory block in the first set of memory blocks; and,
   in accordance with a determination that a power fail condition did not occur while the progress-counter indicates the second stage:
      updating the progress indicator to indicate a third stage;
      performing a set of third stage operations, including
         storing, in the second set of memory blocks, the second set of metadata encrypted using the second encryption key; and
         subsequent to storing, in the second set of memory blocks, the second set of metadata encrypted using the second encryption key, setting the second encryption key as the current encryption key for the plurality of memory blocks.

2. The method of claim 1, further comprising:
   in accordance with a determination that a power fail condition occurred while the progress indicator indicates the first stage, repeating performance of the first stage operations.

3. The method of claim 1, further comprising:
   in accordance with a determination that a power fail condition occurred while the progress indicator indicates the second stage, repeating performance of the second stage operations.

4. The method of claim 1, further comprising:
   in accordance with a determination that a power fail condition occurred while the progress indicator indicates the third stage, repeating performance of the third stage operations.

5. The method of claim 1, including, prior to storing, in the first set of memory blocks, the second set of metadata encrypted using the second encryption key:
   decrypting the second set of metadata using the first encryption key; and
   encrypting the second set of metadata using the second encryption key.

6. The method of claim 1, wherein the second stage operations include durably storing information identifying the first set of memory blocks.

7. The method of claim 1, wherein setting the second encryption key as the current encryption key for the plurality of memory blocks includes rendering the first encryption key unusable.

8. The method of claim 1, wherein obtaining a second encryption key includes:
   encrypting the second encryption key; and
   durably storing the encrypted second encryption key.

9. The method of claim 1, including selecting the first set of memory blocks from a plurality of memory blocks on the storage device by selecting memory blocks with the fewest erase cycles, memory blocks with fastest read or write times, or a first available set of memory blocks.

10. The method of claim 1, further comprising, subsequent to storing, in the second set of memory blocks, the second set of metadata encrypted using the second encryption key, erasing at least a portion of the first set of memory blocks and storing, in the erased portion of the first set of memory blocks, the first set of metadata encrypted using the second encryption key.

11. A method of cryptographically erasing data in a storage device having a first set of memory blocks and a second set of memory blocks, wherein the second set of memory blocks does not comprise any memory block in the first set of memory blocks, the first set of memory blocks storing a first set of metadata and the second set of memory blocks storing a second set of metadata, the storage device further having a first encryption key established as a current encryption key, to encrypt metadata and data, if any, in at least the first and second sets of memory blocks, prior to performance of the method, the method comprising:
   performing a power-failure tolerant cryptographic erase operation, including:
      obtaining and storing a second encryption key;
      storing, in the first set of memory blocks, the second set of metadata encrypted with the second encryption key;
      subsequent to storing, in the first set of memory blocks, the second set of metadata encrypted with the second encryption key, storing the second set of metadata encrypted with the second encryption key at corresponding locations in the second set of memory blocks;

storing the first set of metadata encrypted with the second encryption key in the first set of memory blocks; and establishing the second encryption key as the current encryption key to encrypt metadata and data, if any, in at least the first and second sets of memory blocks, wherein performing the cryptographic erase operation further comprises:

storing in non-volatile memory a progress indicator that indicates a stage of the cryptographic erase operation, and updating the progress indicator upon completion of each stage of a predefined set of stages of the cryptographic erase operation;

determining whether a power failure has occurred while performing the cryptographic erase operation; and, in accordance with a determination that a power failure has occurred while performing the cryptographic erase operation, resuming performance of the cryptographic erase operation at a stage corresponding to a value of the progress indicator.

12. A storage device, comprising:

an interface for coupling the storage device to a host system; and a controller having one or more processors, the controller configured to:

update a durably stored progress indicator to indicate a first stage;

perform a set of first stage operations, including:
 obtain a second encryption key;
 in accordance with a determination that a power fail condition did not occur while the progress indicator indicates the first stage:
  update the progress indicator to indicate a second stage;
  perform a set of second stage operations, including:
   store, in a first set of memory blocks on the storage device, a first set of metadata corresponding to the first set of memory blocks, encrypted using the second encryption key; and
   store, in the first set of memory blocks, a second set of metadata corresponding to a second set of memory blocks on the storage device, encrypted using the second encryption key, wherein the second set of memory blocks does not comprise any memory block in the first set of memory blocks; and,
  in accordance with a determination that a power fail condition did not occur while the progress-counter indicates the second stage:
   update the progress indicator to indicate a third stage;
   perform a set of third stage operations, including storing, in the second set of memory blocks, the second set of metadata encrypted using the second encryption key; and,
   subsequent to storing, in the second set of memory blocks, the second set of metadata encrypted using the second encryption key, set the second encryption key as the current encryption key for the plurality of memory blocks.

13. The storage device of claim 12, wherein the controller is further configured to:

in accordance with a determination that a power fail condition occurred while the progress indicator indicates the first stage, repeat performance of the first stage operations.

14. The storage device of claim 12, wherein the controller is further configured to:

in accordance with a determination that a power fail condition occurred while the progress indicator indicates the second stage, repeat performance of the second stage operations.

15. The storage device of claim 12, wherein the controller is further configured to:

in accordance with a determination that a power fail condition occurred while the progress indicator indicates the third stage, repeat performance of the third stage operations.

16. The storage device of claim 12, wherein the second stage operations include durably storing information identifying the first set of memory blocks.

17. The storage device of claim 12, wherein the controller is further configured to render the first encryption key unusable.

18. The storage device of claim 12, wherein the controller is further configured to select, as the first set of memory blocks, memory blocks with the fewest erase cycles, memory blocks with fastest read or write times, or a first available set of memory blocks.

19. The storage device of claim 12, wherein the controller is further configured to, subsequent to storing, in the second set of memory blocks, the second set of metadata encrypted using the second encryption key, erase at least a portion of the first set of memory blocks and store, in the erased portion of the first set of memory blocks, the first set of metadata encrypted using the second encryption key.

20. A non-transitory computer readable storage medium, storing one or more programs for execution by one or more processors of a storage device, the one or more programs including instructions for:

updating a durably stored progress indicator to indicate a first stage;

performing a set of first stage operations, including:
 obtaining a second encryption key;
 in accordance with a determination that a power fail condition did not occur while the progress indicator indicates the first stage:
  updating the progress indicator to indicate a second stage;
  performing a set of second stage operations, including:
   storing, in a first set of memory blocks on the storage device, a first set of metadata corresponding to the first set of memory blocks, encrypted using the second encryption key; and
   storing, in the first set of memory blocks, a second set of metadata corresponding to a second set of memory blocks on the storage device, encrypted using the second encryption key, wherein the second set of memory blocks does not comprise any memory block in the first set of memory blocks; and,
  in accordance with a determination that a power fail condition did not occur while the progress-counter indicates the second stage:
   updating the progress indicator to indicate a third stage;
   performing a set of third stage operations, including storing, in the second set of memory blocks, the second set of metadata encrypted using the second encryption key; and subsequent to storing, in the second set of memory blocks, the second set of metadata encrypted using the second encryption key, setting the second encryption key as the current encryption key for the plurality of memory blocks.

21. The method of claim 11, wherein performing the power-failure tolerant cryptographic erase operation includes:
   erasing data stored in the first set of memory blocks prior to storing, in the first set of memory blocks, the second set of metadata encrypted with the second encryption key; and
   erasing data stored in the second set of memory blocks prior to storing the second set of metadata encrypted with the second encryption key at corresponding locations in the second set of memory blocks.

22. The method of claim 21, wherein the first set of memory blocks and the second set of memory blocks are non-volatile memory blocks.

23. A storage device, comprising:
   a plurality of memory blocks including a first set of memory blocks and a second set of memory blocks, wherein the second set of memory blocks does not comprise any memory block in the first set of memory blocks, the first set of memory blocks storing a first set of metadata and the second set of memory blocks storing a second set of metadata;
   an interface for coupling the storage device to a host system; and
   a controller having one or more processors, an encryption module, and a first encryption key established as a current encryption key, the controller configured to perform a power-failure tolerant cryptographic erase operation to erase data stored in the storage device by:
      obtaining and storing a second encryption key;
      storing, in the first set of memory blocks, the second set of metadata encrypted with the second encryption key;
      subsequent to storing, in the first set of memory blocks, the second set of metadata encrypted with the second encryption key, storing the second set of metadata encrypted with the second encryption key at corresponding locations in the second set of memory blocks;
      storing the first set of metadata encrypted with the second encryption key in the first set of memory blocks; and
      establishing the second encryption key as the current encryption key to encrypt metadata and data, if any, in at least the first and second sets of memory blocks,
   wherein performing the cryptographic erase operation further comprises:
      storing in non-volatile memory a progress indicator that indicates a stage of the cryptographic erase operation, and updating the progress indicator upon completion of each stage of a predefined set of stages of the cryptographic erase operation;
      determining whether a power failure has occurred while performing the cryptographic erase operation; and
      in accordance with a determination that a power failure has occurred while performing the cryptographic erase operation, resuming performance of the cryptographic erase operation at a stage corresponding to a value of the progress indicator.

24. The storage device of claim 23, wherein the controller is further configured to:
   erase data stored in the first set of memory blocks prior to storing, in the first set of memory blocks, the second set of metadata encrypted with the second encryption key; and
   erase data stored in the second set of memory blocks prior to storing the second set of metadata encrypted with the second encryption key at corresponding locations in the second set of memory blocks.

25. The storage device of claim 24, wherein the first set of memory blocks and the second set of memory blocks are non-volatile memory blocks.

26. A non-transitory computer readable storage medium, storing one or more programs for execution by one or more processors of a storage device, the storage device having a plurality of memory blocks including a first set of memory blocks and a second set of memory blocks, wherein the second set of memory blocks does not comprise any memory block in the first set of memory blocks, the one or more programs including instructions for performing a power-failure tolerant cryptographic erase operation to erase data stored in the storage device by:
   accessing, in the storage device, data previously encrypted using a first encryption key;
   obtaining and storing a second encryption key;
   storing, in the first set of memory blocks, a first set of metadata corresponding to the first set of memory blocks, encrypted using the second encryption key; and
   storing, in the first set of memory blocks, a second set of metadata corresponding to the second set of memory blocks, encrypted using the second encryption key;
   subsequent to storing, in the first set of memory blocks, the second set of metadata encrypted with the second encryption key, storing the second set of metadata encrypted with the second encryption key at corresponding locations in the second set of memory blocks;
   storing the first set of metadata encrypted with the second encryption key in the first set of memory blocks; and
   establishing the second encryption key as the current encryption key to encrypt metadata and data, if any, in at least the first and second sets of memory blocks,
   wherein performing the cryptographic erase operation further comprises:
      storing in non-volatile memory a progress indicator that indicates a stage of the cryptographic erase operation, and updating the progress indicator upon completion of each stage of a predefined set of stages of the cryptographic erase operation;
      determining whether a power failure has occurred while performing the cryptographic erase operation; and,
      in accordance with a determination that a power failure has occurred while performing the cryptographic erase operation, resuming performance of the cryptographic erase operation at a stage corresponding to a value of the progress indicator.

27. The non-transitory computer readable storage medium of claim 26, wherein the one or more programs further include instructions to:
   erase data stored in the first set of memory blocks prior to storing, in the first set of memory blocks, the second set of metadata encrypted with the second encryption key; and
   erase data stored in the second set of memory blocks prior to storing the second set of metadata encrypted with the second encryption key at corresponding locations in the second set of memory blocks.

28. The non-transitory computer readable storage medium of claim 27, wherein the first set of memory blocks and the second set of memory blocks are non-volatile memory blocks.

29. A storage device, comprising:
- a plurality of memory blocks including a first set of memory blocks and a second set of memory blocks, wherein the second set of memory blocks does not comprise any memory block in the first set of memory blocks;
- an interface for coupling the storage device to a host system; and
- a controller having one or more processors, an encryption module, and a first encryption key established as a current encryption key, the controller configured to perform a power-failure tolerant cryptographic erase operation to erase data stored in the storage device by:
- performing a set of first stage operations, including: obtaining a second encryption key;
- performing a set of second stage operations, including:
  - erasing data stored in the first set of memory blocks;
  - storing, in the first set of memory blocks, a first set of metadata corresponding to the first set of memory blocks, encrypted using the second encryption key; and
  - storing, in the first set of memory blocks, a second set of metadata corresponding to the second set of memory blocks, encrypted using the second encryption key; and
- performing a set of third stage operations, including:
  - erasing data stored in the second set of memory blocks; and
  - storing, in the second set of memory blocks, the second set of metadata encrypted using the second encryption key; and
- subsequent to storing, in the second set of memory blocks, the second set of metadata encrypted using the second encryption key, setting the second encryption key as the current encryption key for the plurality of memory blocks;
- wherein performing the cryptographic erase operation further comprises:
  - storing in non-volatile memory a progress indicator that indicates a stage of the cryptographic erase operation, and updating the progress indicator upon completion of each stage of a predefined set of stages of the cryptographic erase operation;
  - determining whether a power failure has occurred while performing the cryptographic erase operation; and
  - in accordance with a determination that a power failure has occurred while performing the cryptographic erase operation, resuming performance of the cryptographic erase operation at a stage corresponding to a value of the progress indicator.

30. The storage device of claim 29, wherein the first set of memory blocks and the second set of memory blocks are non-volatile memory blocks.

* * * * *